(12) United States Patent
MacDonald Korth et al.

(10) Patent No.: US 8,719,075 B2
(45) Date of Patent: May 6, 2014

(54) SYSTEM, PROGRAM PRODUCT, AND METHODS FOR ONLINE IMAGE HANDLING

(75) Inventors: Holly C. MacDonald Korth, Salt Lake City, UT (US); Samuel Jacob Peterson, Salt Lake City, UT (US)

(73) Assignee: Overstock.com, Inc., Salt Lake City, UT (US)

( * ) Notice: Subject to any disclaimer, the term of this patent is extended or adjusted under 35 U.S.C. 154(b) by 2551 days.

(21) Appl. No.: 11/210,230

(22) Filed: Aug. 23, 2005

(65) Prior Publication Data
US 2006/0069623 A1    Mar. 30, 2006

Related U.S. Application Data

(60) Provisional application No. 60/612,602, filed on Sep. 23, 2004.

(51) Int. Cl.
*G06Q 30/00* (2012.01)
(52) U.S. Cl.
USPC .......................................................... 705/7.35
(58) Field of Classification Search
USPC .......................................................... 705/35
See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,808,987 A | 2/1989 | Takeda et al. |
| 4,823,265 A | 4/1989 | Nelson |

(Continued)

FOREIGN PATENT DOCUMENTS

| | | |
|---|---|---|
| CA | 02253543 | 11/1998 |
| CA | 2347812 | 5/2000 |

(Continued)

OTHER PUBLICATIONS

"PictureWorks Technology, Inc. Expands in Real Estate Market With Adoption of Rimfire on REALTOR.com"; Nov. 8, 1999; Business Wire [New York].*

(Continued)

*Primary Examiner* — Leland Marcus
(74) *Attorney, Agent, or Firm* — Clayton, Howarth & Cannon, P.C.

(57) ABSTRACT

A system to facilitate electronic commerce associated with an online marketplace, program product, and methods are provided. Electronic commerce over a computer network is facilitated by a computer system that forms a community of computers that enable the users to buy and sell items in an online marketplace. To list the item on an online marketplace website, for example, the selling user posts an item with the marketplace website by completing an online-item creation form. The form requires input related to the item, such as a description, sale price or minimum bid, shipping instructions, and the like. The selling user uploads an image file of the item to the marketplace website's server. The server contains a random image size generator that generates at least two additional images of the item that are presented to the selling user for selection of the image that the selling user wants to include on the selling website to advertise the item.

32 Claims, 22 Drawing Sheets

(56) References Cited

U.S. PATENT DOCUMENTS

| | | | |
|---|---|---|---|
| 4,903,201 A | 2/1990 | Wagner | |
| RE33,316 E | 8/1990 | Katsuta et al. | |
| 5,027,110 A | 6/1991 | Chang et al. | |
| 5,053,956 A | 10/1991 | Donald et al. | |
| 5,063,507 A | 11/1991 | Lindsey et al. | |
| 5,077,665 A | 12/1991 | Silverman et al. | |
| 5,101,353 A | 3/1992 | Lupien et al. | |
| 5,136,501 A | 8/1992 | Silverman et al. | |
| 5,168,446 A | 12/1992 | Wiseman | |
| 5,243,515 A | 9/1993 | Lee | |
| 5,258,908 A | 11/1993 | Hartheimer et al. | |
| 5,297,031 A | 3/1994 | Gutterman et al. | |
| 5,297,032 A | 3/1994 | Trojan et al. | |
| 5,301,350 A * | 4/1994 | Rogan et al. | 705/33 |
| 5,305,200 A | 4/1994 | Hartheimer et al. | |
| 5,325,297 A | 6/1994 | Bird et al. | |
| 5,329,589 A | 7/1994 | Fraser et al. | |
| 5,347,632 A | 9/1994 | Filepp et al. | |
| 5,375,055 A | 12/1994 | Togher et al. | |
| 5,394,324 A | 2/1995 | Clearwater | |
| 5,426,281 A | 6/1995 | Abecassis | |
| 5,485,510 A | 1/1996 | Colbert | |
| 5,493,677 A | 2/1996 | Balogh et al. | |
| 5,553,145 A | 9/1996 | Micali | |
| 5,557,728 A | 9/1996 | Garrett et al. | |
| 5,579,471 A | 11/1996 | Barber et al. | |
| 5,596,994 A | 1/1997 | Bro | |
| 5,598,557 A | 1/1997 | Doner et al. | |
| 5,640,569 A | 6/1997 | Miller et al. | |
| 5,657,389 A | 8/1997 | Houvener | |
| 5,664,111 A | 9/1997 | Nahan et al. | |
| 5,664,115 A | 9/1997 | Fraser | |
| 5,689,652 A | 11/1997 | Lupien et al. | |
| 5,694,546 A | 12/1997 | Reisman | |
| 5,706,457 A | 1/1998 | Dwyer et al. | |
| 5,710,889 A | 1/1998 | Clark et al. | |
| 5,715,314 A | 2/1998 | Payne et al. | |
| 5,715,402 A | 2/1998 | Popolo | |
| 5,717,989 A | 2/1998 | Tozzoli et al. | |
| 5,721,908 A | 2/1998 | Lagarde et al. | |
| 5,722,418 A | 3/1998 | Bro | |
| 5,727,165 A | 3/1998 | Ordish et al. | |
| 5,737,599 A | 4/1998 | Rowe et al. | |
| 5,760,917 A | 6/1998 | Sheridan | |
| 5,761,655 A | 6/1998 | Hoffman | |
| 5,771,291 A | 6/1998 | Newton et al. | |
| 5,771,380 A | 6/1998 | Tanaka et al. | |
| 5,778,367 A | 7/1998 | Wesinger, Jr. et al. | |
| 5,790,790 A | 8/1998 | Smith et al. | |
| 5,794,216 A | 8/1998 | Brown | |
| 5,794,219 A | 8/1998 | Brown | |
| 5,796,395 A | 8/1998 | De Hond | |
| 5,799,285 A | 8/1998 | Klingman | |
| 5,803,500 A | 9/1998 | Mossberg | |
| 5,818,914 A | 10/1998 | Fujisaki | |
| 5,826,244 A | 10/1998 | Huberman | |
| 5,835,896 A | 11/1998 | Fisher et al. | |
| 5,845,265 A | 12/1998 | Woolston | |
| 5,845,266 A | 12/1998 | Lupien et al. | |
| 5,850,442 A | 12/1998 | Muftic | |
| 5,870,754 A | 2/1999 | Dimitrova et al. | |
| 5,872,848 A | 2/1999 | Romney et al. | |
| 5,873,069 A | 2/1999 | Reuhl et al. | |
| 5,884,056 A | 3/1999 | Steele | |
| 5,890,138 A | 3/1999 | Godin et al. | |
| 5,890,175 A | 3/1999 | Wong | |
| 5,905,975 A | 5/1999 | Ausubel | |
| 5,922,074 A | 7/1999 | Richard et al. | |
| 5,924,072 A | 7/1999 | Havens | |
| 5,926,794 A | 7/1999 | Fethe | |
| 5,948,040 A * | 9/1999 | DeLorme et al. | 701/201 |
| 5,948,061 A | 9/1999 | Merriman et al. | |
| 5,974,412 A | 10/1999 | Hazlehurst et al. | |
| 5,986,662 A | 11/1999 | Argiro et al. | |
| 5,991,739 A | 11/1999 | Cupps et al. | |
| 5,999,915 A | 12/1999 | Nahan et al. | |
| 6,035,288 A | 3/2000 | Solomon | |
| 6,035,402 A | 3/2000 | Vaeth et al. | |
| 6,044,363 A | 3/2000 | Mori et al. | |
| 6,045,447 A | 4/2000 | Yoshizawa et al. | |
| 6,047,264 A | 4/2000 | Fisher et al. | |
| 6,055,518 A | 4/2000 | Franklin et al. | |
| 6,058,379 A | 5/2000 | Odom et al. | |
| 6,058,417 A * | 5/2000 | Hess et al. | 709/219 |
| 6,058,428 A | 5/2000 | Wang et al. | |
| 6,061,448 A | 5/2000 | Smith et al. | |
| 6,065,041 A | 5/2000 | Lum et al. | |
| 6,073,117 A | 6/2000 | Oyanagi et al. | |
| 6,085,176 A | 7/2000 | Woolston | |
| 6,104,815 A | 8/2000 | Alcorn et al. | |
| 6,119,137 A | 9/2000 | Smith et al. | |
| 6,128,649 A | 10/2000 | Smith et al. | |
| 6,141,010 A | 10/2000 | Hoyle | |
| 6,167,382 A | 12/2000 | Sparks et al. | |
| 6,178,408 B1 | 1/2001 | Copple et al. | |
| 6,192,407 B1 | 2/2001 | Smith et al. | |
| 6,202,051 B1 | 3/2001 | Woolston | |
| 6,202,061 B1 | 3/2001 | Khosla et al. | |
| 6,226,412 B1 * | 5/2001 | Schwab | 705/26 |
| 6,243,691 B1 | 6/2001 | Fisher et al. | |
| 6,269,238 B1 | 7/2001 | Iggulden | |
| 6,271,840 B1 | 8/2001 | Finseth et al. | |
| 6,275,829 B1 | 8/2001 | Angiulo et al. | |
| 6,356,908 B1 | 3/2002 | Brown et al. | |
| 6,366,899 B1 | 4/2002 | Kernz | |
| 6,374,260 B1 | 4/2002 | Hoffert et al. | |
| 6,381,510 B1 | 4/2002 | Amidhozour et al. | |
| 6,415,320 B1 | 7/2002 | Hess et al. | |
| 6,456,307 B1 * | 9/2002 | Bates et al. | 715/838 |
| 6,460,020 B1 * | 10/2002 | Pool et al. | 705/26 |
| 6,466,917 B1 | 10/2002 | Goyal et al. | |
| 6,484,149 B1 | 11/2002 | Jammes et al. | |
| 6,523,037 B1 | 2/2003 | Monahan et al. | |
| 6,604,107 B1 | 8/2003 | Wang | |
| 6,643,696 B2 | 11/2003 | Davis | |
| 6,665,838 B1 | 12/2003 | Brown et al. | |
| 6,732,161 B1 | 5/2004 | Hess et al. | |
| 6,732,162 B1 | 5/2004 | Wood et al. | |
| 2001/0034667 A1 | 10/2001 | Petersen | |
| 2001/0034668 A1 * | 10/2001 | Whitworth | 705/27 |
| 2002/0002513 A1 | 1/2002 | Chiasson | |
| 2002/0022995 A1 | 2/2002 | Miller et al. | |
| 2002/0026390 A1 | 2/2002 | Ulenas et al. | |
| 2002/0107718 A1 | 8/2002 | Morrill et al. | |
| 2003/0009392 A1 | 1/2003 | Perkowski | |
| 2003/0036914 A1 | 2/2003 | Fitzpatrick et al. | |
| 2003/0046149 A1 | 3/2003 | Wong | |
| 2003/0110100 A1 * | 6/2003 | Wirth, Jr. | 705/27 |
| 2003/0139969 A1 | 7/2003 | Scroggie et al. | |
| 2003/0158792 A1 | 8/2003 | Perkowski | |
| 2003/0163340 A1 | 8/2003 | Fitzpatrick et al. | |
| 2003/0167213 A1 | 9/2003 | Jammes et al. | |
| 2004/0078388 A1 | 4/2004 | Melman | |
| 2004/0249727 A1 * | 12/2004 | Cook, Jr. et al. | 705/27 |

FOREIGN PATENT DOCUMENTS

| | | |
|---|---|---|
| CA | 2347812 A1 | 5/2000 |
| EP | 0 636 993 B1 | 4/1999 |
| EP | 0 807 891 B1 | 5/2000 |
| EP | 1241603 | 9/2002 |
| JP | 2001283083 A | 10/2001 |
| WO | WO 97/17663 A1 | 5/1997 |
| WO | WO 98/32289 A2 | 7/1998 |
| WO | WO 98/47082 A1 | 10/1998 |
| WO | WO 99/59283 A2 | 11/1999 |
| WO | WO 00/25218 A1 | 5/2000 |

OTHER PUBLICATIONS

"PictureWorks Technology, Inc. Shows Strong Revenue Growth in Internet Imaging Business"; Nov. 10, 1999; Business Wire [New York].*

(56) References Cited

OTHER PUBLICATIONS

Malone, Thomas W., article, "Electronic Markets and Electronic Hierarchies," Communications of the ACM, vol. 30, No. 6, pp. 484-497 (Jun. 1987).
Warbelow, Art, published case, "AUCNET: TV Auction Network System," Harvard Business School, pp. 1-15 (Jul. 19, 1989).
Clemons, Eric K., publication, "Evaluating the Prospects for Alternative Electronic Securities Markets," Proceedings, 12th International Conference on Information Systems, pp. 53-63 (Dec. 1991), found at http://portal.acm.org/citation.cfm?id.
Neo, Boon Siong, article, "The Implementation of an Electronic Market for Pig Trading in Singapore," Journal of Strategic Information Systems, vol. 1, No. 5, pp. 278-288 (Dec. 1992).
Reck, Martin, article, "Formally Specifying an Automated Trade Execution System," The Journal of Systems and Software, Special Issue, pp. 245-252 (1993).
Teo, Hock-Hai, journal paper, "Organizational Factors of Success in Using EDIS: A Survey of Tradenet Participants," EM—Electronic Markets, vol. 3, No. 3 (Oct. 1993).
Alt, Rainer et al., journal paper, "Computer Integrated Logistics," EM—Electronic Markets, vol. 3, No. 3 (Oct. 1993).
Braganza, Ashley, journal paper, "Is Research at Cranfield—A Look at the Future," EM—Electronic Markets, vol. 3, No. 3 (Oct. 1993).
Brecht, Leo et al., journal paper, "The IM2000 Research Programme",EM—Electronic Markets, vol. 3, No. 3 (Oct. 1993).
O'Mahony Donal, journal paper, "An X.500-based EM—Electronic Markets", vol. 3, No. 3 (Oct. 1993)Product Catalogue, EM—Electronic Markets, vol. 3, No. 3 (Oct. 1993).
Zimmerman, Hans-Dieter, journal paper, "Integration of Financial Services: The TeleCounter," EM—Electronic Markets, vol. 3, No. 3 (Oct. 1993).
Massimb, Marcel N., article, "Electronic Trading, Market Structure and Liquidity", Financial Analysts Journal, pp. 39-49 (Jan.-Feb. 1994).
Hess, Christopher M., article, "Computerized Loan Origination Systems: An Industry Case Study of the Electronic Markets Hypothesis," Management Information System Quarterly, vol. 18, No. 3, pp. 251-275 (Sep. 1994).
Rockoff, Todd E., article, "Design of an Internet-Based System for Remote Dutch Auctions", Internet Research; Electronic Networking Applications and Policy, vol. 5, No. 4, pp. 10-16 (1995).
[Author Unknown], Disclosure, "Personal Optimized Decision/Transaction Program," IBM Technical Disclosure Bulletin, vol. 38, No. 01, pp. 83-84 (Jan. 1995).
[Author Unknown], article, "ONSALE Brings Thrill of Auctions and Bargain Hunting Online; Unique Internet retail service debuts with week-long charity auction for the Computer Museum in Boston," www.dialogweb.com/cgi/dwclient?dwcommand=DWEBPRINT%20810-489267 (May 24, 1995).
Post, D.L., et al, journal, "Application of Auctions as a Pricing Mechanism for the Interchange of Electric Power," IEEE Transactions on Power Systems, vol. 10, No. 3, pp. 1580-1584 (Aug. 1995).
Siegmann, Ken, abstract of disclosure, "Nowhere to go but up," PC Week, vol. 12, No. 2, p. A5, www.dialogweb.com/cgi/dwclient?dwcommand=DWEBPRINT%20148-8222496 (Oct. 23, 1995).
[Author Unknown], article, "Anonymous Delivery of Goods in Electronic Commerce," IBM Technical Disclosure Bulletin, vol. 39, No. 03, pp. 363-366 (Mar. 1996).
Mardesich, Jodi, article, "Onsale Takes Auction Gavel Electronic," Computer Reseller News, pp. 24, 32 (Jul. 8, 1996).
Lee, Ho Geun, symposium, "Electronic Brokerage and Electronic Auction: The Impact of IT on Market Structures," Proceedings of the 29th Annual Hawaii International Conference on System Sciences, vol. 4, pp. 397-406 (1996).
Zwass, Vladimir, article, "Electronic Commerce: Structures and Issues," International Journal of Electronic Commerce, vol. 1, No. 1, pp. 3-23, http://www.cba.bgsu.edu/ijec/ (Fall, 1996).
Tjostheim, Ingvar, et al., article, "A case study of an on-line auction for the World Wide Web," http://www.nr.no/~ingvar/enter98.html (1997).
Klein, Stefan, journal, "Introduction to Electronic Auctions," EM—Electronic Markets, vol. 7, No. 4 (Dec. 1997).
Lee, Ho Geun, journal, "AUCNET: Electronic Intermediary for Used-Car Transactions," EM—Electronic Markets, vol. 7, No. 4 (Dec. 1997).
Van Heck, Eric, journal, "Experiences with Electronic Auctions in the Dutch Flower Industry," EM—Electronic Markets, vol. 7, No. 4 (Dec. 1997).
Reck, Martin, journal, "Trading-Process Characteristics of Electronic Auctions," EM—Electronic Markets, vol. 7, No. 4 (Dec. 1997).
Turban, Efraim, journal, "Auctions and Bidding on the Internet: An Assessment," EM—Electronic Markets, vol. 7, No. 4 (Dec. 1997).
Preist, Chris, et al., journal, "Adaptive Agents in a Persistent Shout Double Auction," Proceedings of the First International Conference on Information and Computation Economies (ICE-98), Charleston, SC, pp. 11-18 (Oct. 1998).
Resnick, Paul, et al., journal, "Reputation Systems," Association for Computing Machinery, vol. 43, No. 12, pp. 45-48 (Dec. 2000).
Graham, Ian, "The Emergence of Linked Fish Markets in Europe," EM—Electronic Markets, vol. 8, No. 2, Jul. 1998, http://www.electronicmarkets.org/modules/pub/view.php/electronicmarkets-189 (Nov. 28, 2005).
Schmid, Beat et al., journal, "Electronic Markets," EM—Electronic Markets, vol. 3, No. 3 (Oct. 1993).
Lee, Ho Guen, et al., journal, "Intelligent Electronic Trading for Commodity Exhanges," EM—Electronics Markets, vol. 3, No. 3 (Oct. 1993).
Weber, Bruce, journal, "How Financial Markets are Going On-line," EM—Electronics Markets, vol. 3, No. 3 (Oct. 1993).
Kuula, Jaana, journal, "Telematic Services in Finland,"EM—Electronics Markets, vol. 3, No. 3 (Oct. 1993).
Mansell, Robin et al., journal, "Electronic Markets—The Development of Electronic Commerce," Electronic Markets—the International Journal, vol. 3, No. 3 (Oct. 1993).
Mansell, Robin et al., journal, "Electronic Trading Networks: The Route to Competitive Advantage?", Electronic Markets—the International Journal, vol. 3, No. 3 (Oct. 1993).
Halpern, Bob, journal, "Toward a Process Handbook for Organizational Coordination Processes," Electronic Markets—the International Journal, vol. 3, No. 3 (10/93).
Clark, Robert, article,"Research Programme in Supra-organizational Systems", Electronic Markets—the Intetnational Journal, vol. 3, No. 3 (Oct. 1993).
Kubicek, Herbert, journal, "The Organization Gap", Electronic Markets—the International Journal, vol. 3, No. 3 (Oct. 1993).
Medvinsky, Gennady, journal, "Electronic Currency for the Internet", Electronic Markets—the International Journal, vol. 3, No. 3 (Oct. 1993).
Neches, Anna-Lena, journal, "FAST—A Research Project in Electronic Commerce," Electronic Markets—the International Journal, vol. 3, No. 3 (Oct. 1993).
Lalonde, Richard, journal, "The EDI World Institute: An International Approach", Electronic Markets—the International Journal, vol. 3, No. 3 (Oct. 1993).
Author Unknown, article, "Bibliography on Electronic Commerce", EM—Electronic Markets, vol. 3, Ed. 9/10 (Oct. 1993).
Search results web page from AuctionWatch.com, found at www.auctionwatch.com.
Web page from Auctiva website found at www.auctiva.com.
Web page from Xchanger.net showing items for sale, found at http//showcase.auctive.com/xchanger.
Article "Onsale joins fray as online shopping picks up speed: Internet Booms," Computer Reseller News, Jun. 5, 1995, p. 73, Diaglog: File 16.
Gunthorpe, Deborah, article, "Portfolio Composition and the Investment Horizon", Financial Analysts Journal, pp. 51-56 (Jan.-Feb. 1994).

(56) References Cited

OTHER PUBLICATIONS

[Editor], comments, "MISQ Central: Creating a New Intellectual Infrastructure," Management Information System Quarterly, vol. 18, No. 3, p. xxxv (Sep. 1994).

Novelli, Brodeur Porter, article/byline, Business Editor, Raleigh, N.C., "Mediappraise Receives National Award for Web-based Technology that Enables Companies to Solve Thorny HR Problem," Today's News on the Net (Dec. 14, 1998).

* cited by examiner

SYSTEM, PROGRAM PRODUCT, AND METHODS FOR ONLINE IMAGE HANDLING

RELATED APPLICATIONS

This application is related to and claims priority to and the benefit of U.S. Provisional Patent Application Ser. No. 60/612,602, filed on Sep. 23, 2004, incorporated herein by reference in its entirety.

BACKGROUND OF THE INVENTION

1. Field of the Invention

The present invention relates in general to electronic commerce and, in particular, to systems, program product, and methods of electronic commerce through communication networks that utilize online image handling to provide users with images of products during online activities.

2. Description of the Related Art

Millions of consumers each year purchase merchandise online through electronic communication (e.g., via the World Wide Web (the "Web")), making online shopping a multi-billion dollar industry. Not only are consumers purchasing new items from online retailers, but consumers are also purchasing items, sometimes previously owned by others, through online marketplaces, e.g., auction sites. With online marketplaces, purchasers can often locate rare collector's items and find good deals on items that they want or need.

Purchasers are not the only ones that have benefited from online marketplaces. Sellers no longer have to resort to local newspaper ads or garage sales to sell their products, both of which take time and only allow sellers to market their products to local buyers. For a small amount of time and money, sellers can have worldwide access to potential purchasers for their items. Many people supplement their income by selling items, such as clothing and toys that their children have outgrown, through online marketplaces. For example, instead of giving the clothing and toys away, sellers can resell the items and recoup at least a portion of the original purchase price.

In some online marketplaces, when a seller decides that they want to sell a product online, the seller typically completes a product registration form and provides a digital image of the item. The registration form of an auction site, for example, typically includes information, such as contact information, product description, starting bid price, the duration of the auction, shipping details, and the like. The registration form and the digital image are uploaded to the online auction website's server, where a selling webpage is generated, or the item is added to an existing webpage, to thereby include and advertise the item that is being sold. On the selling webpage, a miniature copy of the digital image of the item is often displayed along with the item description to enable potential buyers to view the item online. If the digital picture was not a close-up picture of the item, it can be difficult to see the item in the miniature copy of the digital image.

In a typical online marketplace transaction, a potential buyer decides upon a good or service that they are interested in purchasing. The potential buyer then initiates access to an online marketplace e-commerce website via the Web, perhaps after conducting a search for the website with a commercial search engine. After the desired marketplace website is located, the potential buyer searches the marketplace website for the desired good or service, either by conducting a search of the website or by paging through the website content. The website content typically contains a title for the item and often a miniature image of the item. If the potential buyer wants to learn more about the item or see a closer view of the item, the potential buyer will click on the title and/or the miniature image to access a detailed description and larger image of the item. The larger image located on this web page is the same as the original digital image supplied by the selling user. An even larger image of the item can be accessed by clicking on the original sized digital image.

In the auction example, if the potential buyer wants to make a bid to attempt to successfully purchase the item, the potential buyer can make a bid for the item. If at the time of the end of auction, the potential buyer has the highest bid, then the potential buyer will be able to purchase the item from the selling user. Once the payment has been submitted to the selling user, the selling user usually is responsible for shipping the item to the buyer in accordance with the shipping instructions that were listed with the detailed description of the item.

Although most current marketplace websites have some usefulness, their shortcomings collectively represent impediments to the conduct of e-commerce, which are addressed and overcome by the present invention.

SUMMARY OF THE INVENTION

In view of the foregoing, embodiments of the present invention advantageously provide enhanced methods, program products, and systems of facilitating electronic commerce between a selling user computer and a potential buyer computer over a network. For example, embodiments of methods, program products, and systems of the present invention advantageously can enhance the quality of images provided in e-commerce type of transactions and can enhance transaction presentation or launch speeds in some types of e-commerce transactions. Also, embodiments of methods, program products, and systems can provide user-selectable image size variations to enhance a seller's selection of images to be displayed to potential buyers.

Embodiments of the present invention include a system to facilitate e-commerce associated with an online marketplace between a plurality of selling users and a plurality of potential buyers over a computer network. For example, an embodiment of a system can include a host computer accessible to the computer network to host the online marketplace, e.g., online auction website, to thereby define a marketplace (e.g., auction site) administrator server. The marketplace administrator server can include memory coupled to a processor to store operating instructions therein along with the online-commerce program product. The system can also include a marketplace administrator server database accessible to the processor of the marketplace administrator server and having database records related to a plurality of items to be sold by the plurality of selling users, and a marketplace administrator image file server accessible to the processor of the marketplace administrator server and having image files related to the plurality of items to be sold by the plurality of selling users.

The system can also include a plurality of selling user computers most of which can be positioned separately at a corresponding plurality of selling user sites remote from the marketplace administrator server, accessible to the computer network. Each selling user computer can have a processor and memory coupled to the processor to store operating instructions therein and to send data related to items for sale, e.g., via auction or direct sales, to the marketplace administrator server, and a display in communication with the processor to graphically display auction items or other forms of items for sale using an associated selling user web browser stored in the memory. The system correspondingly can also include a plurality of potential buyer computers most of which also can be positioned separately at a corresponding plurality of potential buyer user sites remote from the marketplace administrator server, accessible to the computer network. Each potential buyer computer can have a processor and memory coupled to the processor to store operating instructions therein and to receive data related to items for sale, and a display in communication with the processor to graphically display seller web pages accessed through the computer network using an associated potential buyer web browser stored in the memory.

The online e-commerce program product stored in the memory of the marketplace administrator server can include instructions that, when executed by the marketplace administrator server, cause the marketplace administrator server to selectively perform various operations including presenting an item-creation form for selling an item, either through direct sales or through auction sales, to a selling user web browser over a communication network. The selling user, preferably previously registered with the online marketplace, accesses the item-creation form through the online marketplace's remote marketplace administrator server, to thereby provide data to create a seller item web page. That is, the selling user can enter data in the item-creation form to develop the item web page to thereby provide item information for one or more associated items for sale. During form completion, the selling user selects or otherwise uploads an original item image file displaying an item image of the item for sale (to be sold). This original item image file can be identified by file location within a selling user computer associated storage device or uniform resource locator.

The online e-commerce program product includes instructions to perform the operations of receiving the original item image file, randomly generating at least two or more sets of scaled item image files, and discarding the original image file. The image files can be randomly generated within respective preselected viewable image size ranges and be provided or displayed to the seller to thereby provide categorical image size variations of the item image, selectable by the selling user, to allow the selling user to choose (select) a chosen item image from each category best representing the item. Advantageously, the item-creation form can include an entry field or other selection indicator, known by those skilled in the art, to allow selection thereof.

One of the sets of scaled item image files, which will be identified as the first set of scaled item image files for illustrative purposes, can provide a selection of relatively large images representing the item image of the item for sale to display an enlarged item image of the item for sale, and can have associated therewith an entry field or other indicator to allow selection thereof. Similarly, another or second set of scaled item images can provide a selection of relatively small images representing the item image of the item for sale, and can have associated therewith an entry field or other indicator to allow selection thereof. The chosen one of the second set of scaled item images, when selected on the seller item web page by a potential buyer utilizing an input device for a potential buyer computer, can function as an icon selectable to send commands to the potential buyer computer and/or remote marketplace administrator server to display the chosen one of the first set of scaled item image files, to thereby display an enlarged image of the item to be sold to the potential buyer.

After image selection by the selling user, for example, of one small image and one large image from the respective first and second sets of item images, a reference to the chosen small and large selected images can be incorporated in the item-creation form. The scaled item images not selected can correspondingly be discarded to minimize storage requirements. Further, either before, after, or partially before and after the selling user selects or otherwise uploads the one or more original item image files and chooses an appropriate image or images generated therefrom, the selling user can enter data for other fields utilized to describe the various attributes of the item or items. For example, the item-creation form can include fields such as: a main category and/or sub-categories of the item; a title and/or subtitle of the item; a physical location of the item, if applicable; pricing information; the item description; user selectable visual enhancements, i.e., highlighting; payment requirements; and shipping requirements and limitations, just to name a few.

The online e-commerce program product also can include instructions to perform the operations of receiving the completed item-creation form, storing in the database associated data entered in the form, somewhat more permanently storing the chosen image files in the image file server, and creating and presenting to a potential buyer the seller item web page including instructions to display each selected small image and a default one of the selected large images. Note, each seller item web page can originate as a template whereby the specific item information and chosen images (image locations) can be added to the template to thereby "create" each individual seller item web page.

In an embodiment of the present invention, in order to minimize the size of the seller item web page, the seller item web page can provide a single large chosen item image viewing location in, e.g., an item description section of the seller item web page, to display each large chosen item image provided by the selling user to represent the item. The seller item web page can further provide a separate chosen item image location for each associated small chosen item image. That is, the seller item web page can display each small chosen item image which can, for example, function to allow the potential buyer to select and view the associated chosen large item image of each view represented by the selling user selected small item images, respectively. Also, one or more of the chosen item images can be presented in different sizes and different locations within the seller item web page as scaled by the browser of the potential buyer computer. Further, in order to standardize the layout of the various seller item web pages among different selling users, according to the preferred embodiment of the present invention, an item information section can be provided that includes a standardized item image of the first uploaded item in the form of either the respective chosen large or small image, but adjusted to a standard size such as, for example, 150 pixels by 150 pixels.

In another embodiment of the present invention, a system to facilitate electronic commerce associated with an online marketplace including an online Internet auction web site between a selling user computer and a potential buyer computer over a computer network is advantageously provided. In this embodiment, the system preferably includes an Internet marketplace website server or marketplace site administrator server that can include a processor and memory (or storage) in communication with or coupled to the processor, to store operating instructions therein, and a database that is accessible to the processor and contains database records about items to be sold by the selling user. The database can be directly associated with the server, that of a third party image service provider, or a combination thereof.

A set of machine-readable instructions is stored in the memory of the server to cause the server to form a community of electronically interconnected users of the computer network to facilitate e-commerce. According to an embodiment of the present invention, an information processor and an image size generator are stored in the memory of the Internet marketplace website administrator server and in communication with the processor. The information processor processes item information provided by the selling user. The image size generator generates preferably randomly sized images from the item file provided by the selling user.

The system includes a selling user computer positioned at a selling user site accessible to the computer network. The selling user computer preferably has a processor, memory, a graphical display, and a user interface each coupled to the processor. The memory which can include both volatile and non-volatile forms, is used to store software or operating instructions therein. The graphical display is used to display images for viewing by the selling user. The user interface provides the selling user with access to manipulate the stored software or operating instructions on the seller's computer, including: those for sending to the server data about an item in, for example, the form of database records; and those for selecting a chosen randomly sized image or images of the item generated by the random image size generator.

In addition to the selling user computer, the system advantageously includes a potential buyer computer positioned at a potential buyer user site accessible to the computer network. The potential buyer computer has a processor and memory, a graphical display, and a user interface all coupled to the processor. The memory is used to store software or operating instructions therein and to receive images and database records from the server. The graphical display is used to display images for the potential buyer. The user interface provides the potential buyer user with access to manipulate the software or operating instructions and received database records.

Embodiments of the present invention also include a computer memory element containing, stored in signal bearing media, a database containing data in computer readable format. Advantageously, such data can indicate a community of electronically interconnected users of a publicly accessible computer network, along with various auction item/item for sale attributes such as, for example, a description of the item including a location and/or name of at least two scaled images of the item generated from an original graphical image of the item supplied by a selling user and randomly sized within a respective predetermined size range.

Embodiments of the present invention include methods of facilitating e-commerce associated with an online marketplace between a plurality of selling users and a plurality of potential buyers over a computer network. For example, in an embodiment of a method of facilitating e-commerce, an item-creation form for selling a first item is presented to a selling user web browser over a computer network. A selling user accesses the item-creation form through the online marketplace's remote marketplace administrator server, to thereby create a seller item web page. The selling user begins entering data in the item-creation form to develop the seller item web page to thereby provide information for one or more associated items to be sold or otherwise for sale. During form completion, the selling user selects or otherwise uploads an original item image file displaying an item image of an item for sale. This original item image file can be identified by file location within a selling user computer associated storage device or uniform resource locator.

Once the original item image file is received by or otherwise provided to the remote marketplace administrator server, at least two or more sets of scaled item image files are randomly generated within respective preselected size ranges and provided or displayed to the seller. The original item image can then be discarded to conserve memory and reduce storage requirements. At least two or more sets of scaled first item image files can advantageously provide categorical image size variations of the item image, selectable by the selling user, to thereby allow the selling user to choose (select) a chosen item image from each category best representing the item for sale. The first set of scaled item image files can provide a selection of relatively large images representing the item image of the item for sale to display an enlarged item image of the item for sale. The selling user is provided an entry field or other selection indicator, known by those skilled in the art, to allow selection thereof. The second set of scaled item images can provide a selection of relatively small images representing the item image of the item for sale, and an entry field or other indicator to allow selection thereof. The chosen one of the second set of scaled item images, when selected on the seller item web page by a potential buyer utilizing an input device for a potential buyer computer, can function as an icon selectable to send commands to the potential buyer computer and/or remote marketplace administrator server to display the chosen one of the first set of scaled item image files, to thereby display to the potential buyer an enlarged image of the item for sale.

After image selection by the selling user of, for example, one small image and one large image from the respective first and second sets of item images, a reference to the chosen small and large selected images can be incorporated in the item-creation form. The scaled item images not selected can be discarded to minimize storage requirements. If desired, the selling user can select or otherwise upload another original item image file displaying another view of the item or, if the item includes multiple sub-items, the selling user can select or otherwise upload an original item image file for each of the sub-items of the item. Regardless of the number of original item image files selected or otherwise uploaded by the selling user, as with selecting or otherwise uploading the first described original item image file, once each additional item image file is provided to or otherwise received by the remote marketplace administrator server, at least two or more sets of scaled item image files for each additional original item image file can be generated and provided or displayed to the seller.

Further either before, after, or partially before and after the selling user selects or otherwise uploads the one or more original item image files and chooses an appropriate image or images generated therefrom, the selling user can enter data for other fields utilized to describe the various attributes of the item or items. Upon submitting the completed item-creation form, associated data entered in the form is then sent over the computer network from the selling user computer to the marketplace administrator server of the online marketplace. The chosen small and large images can be somewhat more permanently stored in a storage medium associated with the marketplace administrator server such as, for example, an image file server. The seller item web page is then formed or otherwise tailored to the specific item or related items that can include instructions to display each selected small image and a default one of the selected large images. The seller item web page can then be presented or otherwise made available to be viewed by the potential buyer.

In another embodiment of a method of facilitating e-commerce, an item-creation form is presented to a selling user web browser over a communication network, e.g., the Web. Once the selling user completes the form, a completed item-creation form is then sent for an item from the selling user computer to an administrator server of an online marketplace over the communication/computer network. The completed item-creation form can include an item description and an item image file or reference thereto. Once the item image is received by an online marketplace's remote administrator server, at least two or more scaled item image files are randomly generated that maintain an image scale of the original item image file. The original item image is then discarded.

To enable the selling user to determine and select the image that best represents the item, at least two sets of scaled item image files can be presented to the selling user to enable the selling user to select a chosen item image to represent the item. For example, two different sizes of digital images (such as, e.g., in the range of 100 pixels by 100 pixels to 200 pixels by 200 pixels and in the range of 200 pixels by 200 pixels to 400 pixels by 400 pixels, respectively) can be provided with three variations of the digital image for each of the two different sizes (or a total of six images). Each of the images can be in the same format, e.g., JPEG or GIF, so that if a JPEG image is provided then the generated images having variations of sizes are also in JPEG. After image selection by the seller, the selected (chosen) image or images are stored on the server. A web page is then created or otherwise populated that includes instructions to display the chosen item image or images. After completing listing of the item, the web page is then available on an online website to be presented to a potential buyer. The web page, for example, can use the chosen item image or images in a viewing size as selected (chosen), in a standardized size, and/or in different sizes generally proportional to the size of the chosen item image, in different locations within the web page, and as scaled by the browser of the potential buyer computer.

Advantageously, embodiments of the methods and systems of the present invention, can, for example, be used with online auction websites, as well as direct and catalog sales websites, or a combination thereof. The selling users and the potential buyers can be individuals or companies. Embodiments of the methods and systems of the present invention also can be used in person-to-person, person-to-business, business-to-business, and business-to-person electronic commerce transactions.

Embodiments of the present invention also include a computer readable medium that is readable by a computer to facilitate electronic commerce between a plurality of selling users (selling user computers) and a plurality of potential buyers (potential buyer computers) in a computer network. For example, a computer readable medium can include a set of instructions that, when executed by a computer, such as, for example, a marketplace administrator server, cause the computer to perform the operations of receiving from the selling user web browser over the network an original item image file displaying an item image of an item for sale via either auction or direct sales, and randomly generating a first and a second set of scaled item image files from the original item image file to provide image size variations of the item image. The instructions can also include those to perform the operations of storing the first and the second sets of scaled item image files on a remote server, and presenting the first and the second set of scaled item image files to the selling user web browser over the network to enable the respective selling user to select a first chosen item image file from the first set of scaled item image files having a relatively large first chosen item image, and to select a second chosen item image file from the second set of scaled item image files having a relatively small second chosen item image, to thereby represent the item for sale. The instructions can also include those to perform the operation receiving from the selling user computer over the network a completed item-creation form for the item including an item title, item description, and data identifying the first and the second chosen item image. The instructions can also include those to perform the operations of adding an item image location of each of the first and the second chosen item images to a seller item web page, and presenting the seller item web page to the potential buyer computer.

According to another embodiment of the present invention, a computer readable medium can include a set of instructions that, when executed by a computer, cause the computer to perform the operations of presenting an item-creation form to a selling user web browser over a computer network, receiving from the selling user computer over the network an original item image file displaying an item image of an item, randomly generating within a predetermined size range at least two scaled item image files that maintain an image scale of the original item image file, storing the at least two scaled item image files on a remote server, and discarding the original image file to conserve storage space and/or memory requirements. The instructions can also include those to perform the operations of presenting the at least two scaled item image files to the selling user web browser over the network to enable a selling user to select a chosen item image to represent the item, and receiving from the selling user computer over the network a completed item-creation form including an item description and data identifying the chosen item image or images, and discarding those not chosen. The instructions can also include those to perform the operations of adding an image location of the chosen item image to a seller web page, and presenting the seller web page to the potential buyer computer.

According to another embodiment of the present invention, a computer readable medium can include a set of instructions that, when executed by a computer, cause the computer to perform the operations of receiving from a selling user computer over a computer network an original item image file displaying an item image of an item for sale, and forming at least one set of scaled item image files from the original item image file to provide image size variations of the item image. The instructions can also include those to perform the operation of presenting the at least one set of scaled item image files to the selling user computer so that the selling user can select a chosen item image to represent the item for sale.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art.

As illustrated in FIGS. 1-22, embodiments of the present invention advantageously provide a system, computer memory element, program product, and methods of facilitating e-commerce between a plurality of selling users and a plurality of potential buyers over a communication or computer network. As known to those skilled in the art, this e-commerce can include but is not limited to online auctions, online retail or wholesale distributors, and individual companies providing items for sale online, and other such online marketplaces. The following description generally refers to online auctions and other such online marketplaces for illustrative purposes only.

Figure 1:
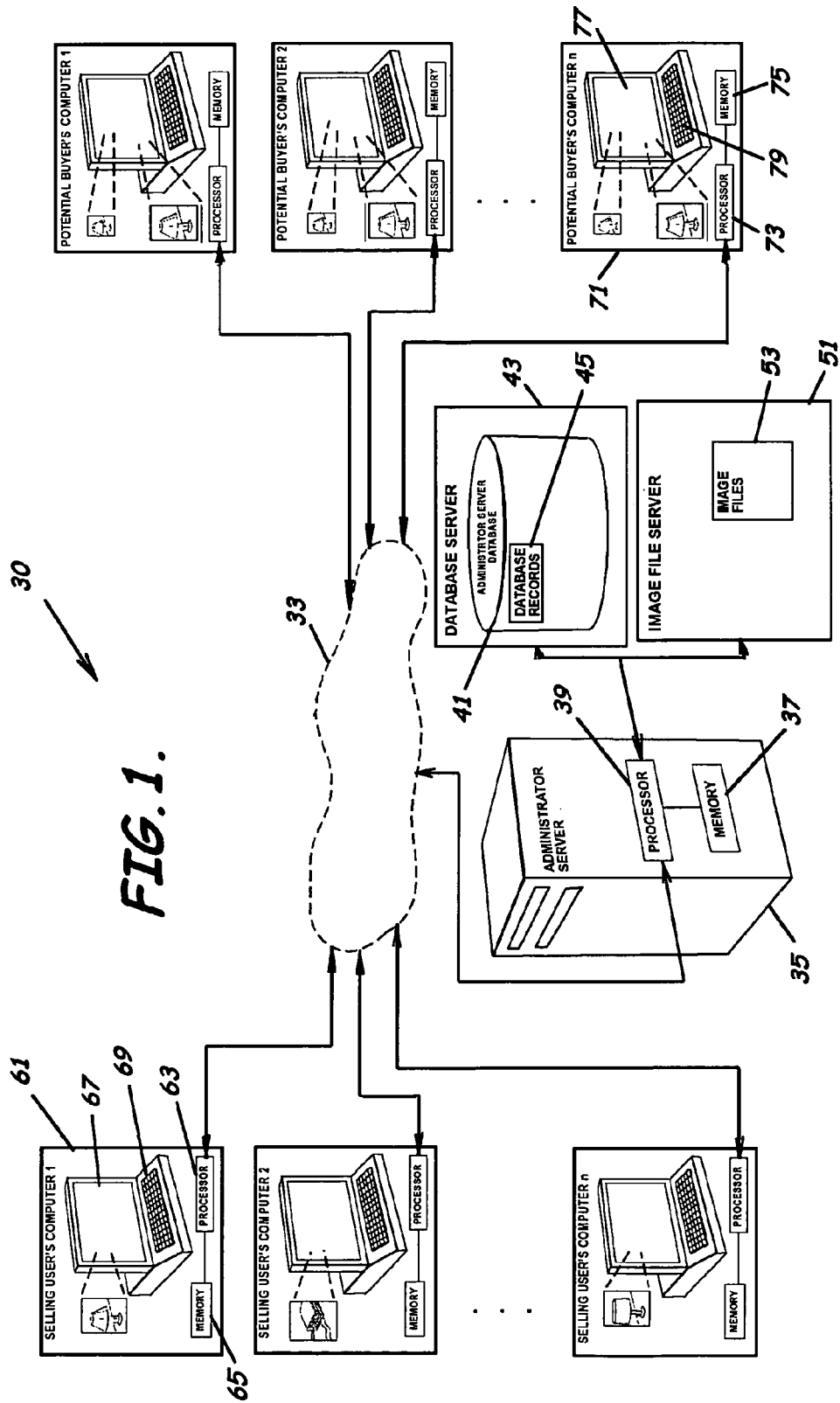
FIG. 1 is a schematic block diagram of a system to facilitate electronic commerce associated with an online marketplace between a plurality of selling users and a plurality of potential buyers over a computer network according to an embodiment of the present invention.

For example, as perhaps best shown in FIGS. 1-18 and 22, a system 30 is provided to facilitate e-commerce through an online marketplace, e.g. online auction website, between a plurality of selling users S and a plurality of potential buyers B over a computer network, according to an embodiment of the present invention. The system 30 includes at least one host computer accessible to the computer network 33 to host the online marketplace website to thereby define a marketplace administrator server 35. The marketplace administrator server 35 has memory 37 coupled to a processor 39 to store operating instructions therein. Note, the memory 37 can include volatile and nonvolatile memory known to those skilled in the art including, for example, RAM, ROM, and magnetic or optical disks, just to name a few. Note, it should also be understood that the preferred server configuration is given by way of example and that other types of servers or computers configured according to various other methodologies known to those skilled in the art can be used. The server 35 shown schematically in, for example, FIG. 1 represents a server or server cluster or server farm and is not limited to any individual physical server. The server site may be deployed as a server farm or server cluster managed by a serving hosting provider. The number of servers and their architecture and configuration may be increased based on usage, demand and capacity requirements for the system 30.

The system 30 can also include an marketplace site administrator server database 41 stored in a database server 43 and accessible to the processor 39 of the marketplace administrator server 35. The database 41 can include database records 45 related to a plurality of items, of items to be sold by the plurality of selling users S along with attribute (registration) data related to each of the selling users S. The database records 45 can include for each item, an item title, item description, item sale or minimum and/or maximum price, associated item image names and/or locations, along with other ancillary data such as shipping, insurance, or tax information and/or instructions. The system 30 can also include a marketplace administrator image file server 51 accessible to the processor 39 of the marketplace administrator server 35 and having image files 53 related to the items to be sold by the selling users S.

The system 30 also includes a plurality of selling user computers 61. Each selling user computer 61 can be positioned at one or more selling user sites remote from the marketplace administrator server 35, accessible to the computer network 33, and can have a processor 63 and memory 65 coupled to the processor 63 to store operating instructions therein and to send data related to an item to the marketplace administrator server 35. Each selling user computer 61 can also include a display 67 in communication with the processor 63 to display items using an associated selling user web browser stored in the memory 65 and a user interface 69 coupled to the processor 63 to provide the selling user with access to manipulate functions within the selling user web browser. Advantageously, this configuration allows each selling user S to view and/or edit selling user registration data and to view and/or edit marketplace item/sale item attributes, upload related images, and manage the promotion and delivery of such items.

The system 30 can also include a plurality of potential buyer computers 71. Each potential buyer computer 71 can be positioned at a separate potential buyer user site remote from the marketplace administrator server 35, accessible to the computer network 33, and a processor 73 and memory 75 coupled to the processor to store operating instructions therein and to receive database records. Each potential buyer computer 71 also can include a display 77 in communication with the processor 73 to display seller marketplace web pages accessed through the computer network 33 using an associated potential buyer web browser stored in the memory 75 and a user interface 79 coupled to the processor 73 to provide the potential buyer B, (FIG. 15) with access to manipulate functions within the potential buyer web browser. Advantageously, this configuration allows the potential buyer B to view marketplace items and to bid on or purchase such items.

Note, although illustrated as a keyboard, the input devices 69, 79, can include other forms of device known to those skilled in the art such as, for example, a light pen, magnetic or optical card reader, trackball, touch screen, touchpad, or mouse. Further, the selling user computers 61 and potential buyer computers 71 each can take various forms known to those skilled in the art such as, for example, a desktop personal computer, portable computer, a PDA, a mobile telephone, and still other devices for accessing the Internet, that are adapted to interface with the computer network 33 while positioned remote from the marketplace administrator server 35.

Figure 2:
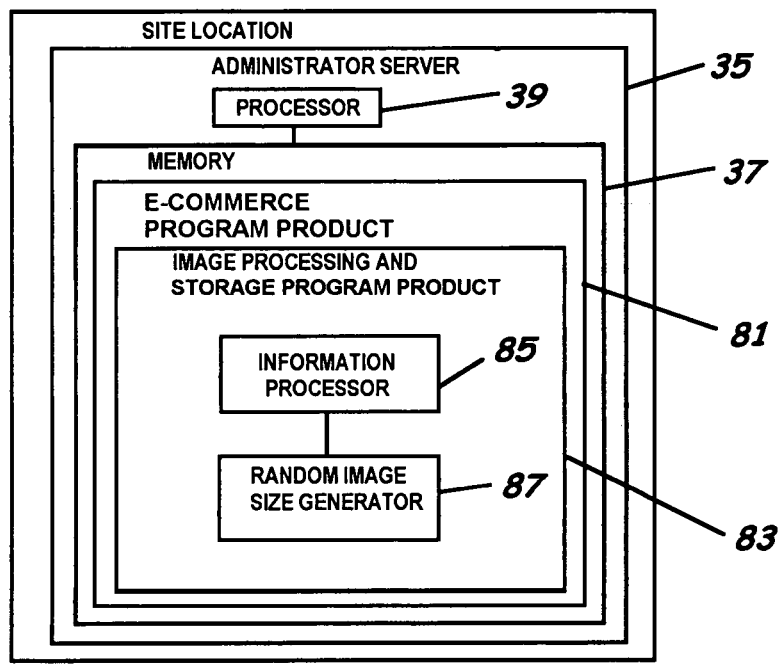
FIG. 2 is a schematic block diagram of an administrator server to facilitate electronic commerce associated with an online marketplace between a plurality of selling users and a plurality of potential buyers over a computer network according to an embodiment of the present invention.
Figure 3:
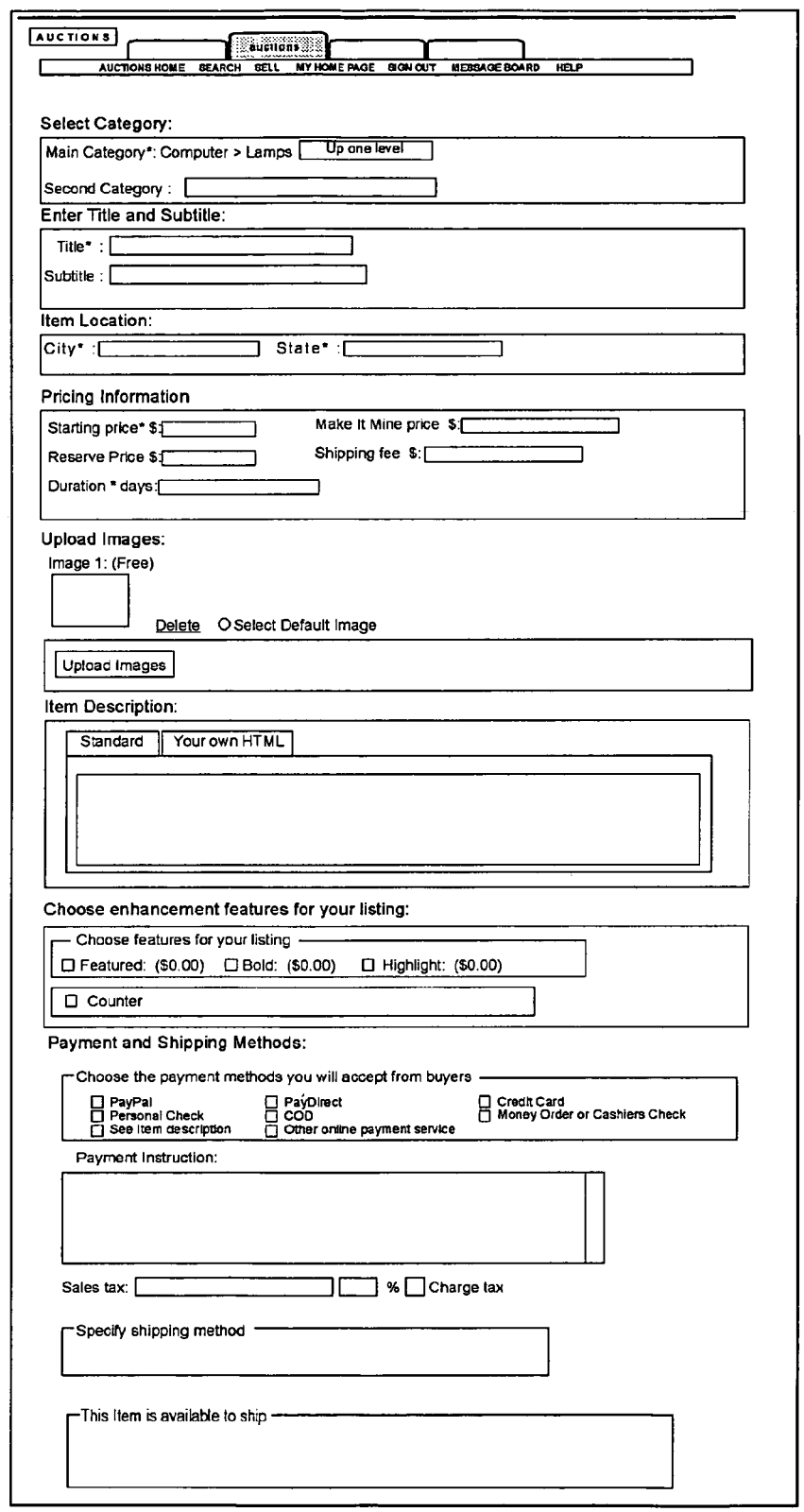
FIG. 3 is a schematic diagram of an item-creation web page form for an auction-format marketplace item to facilitate electronic commerce between a plurality of selling users and a plurality of potential buyers over a computer network according to an embodiment of the present invention.

As perhaps best shown in FIG. 2, the system 30 also includes online e-commerce program product 81 stored in the memory 37 of the marketplace administrator server 35 which provides the server 35 the functionality to facilitate e-commerce through the online marketplace between the plurality of selling users and the plurality of potential buyers B over a computer network 33. The online e-commerce program product 81 includes functionality to allow multiple selling (choose) users to initialize a new marketplace items, enter related data, edit the data, uploading item images, select system provided item images, and/or review such data and images prior to posting. The online e-commerce program product 81 also includes functionality to allow multiple potential buyers B to search for and access such data, view attributes of the marketplace items, and bid on or purchase such items. Note, the e-commerce program product 81, according to an embodiment of the present invention, needed not reside in its entirety in volatile memory, but can be selectively loaded, as necessary, according to various methodologies as known and understood by those skilled in the art.

According to an embodiment of the present invention, the online e-commerce program product 81 is a web-based program that provides web-based functionality. Accordingly, beyond the installation of a common web browser, specialized software installation is not necessary. Because of such Internet-based functionality, such program product is portable to multiple computer systems and is easily accessible by multiple concurrent users at a single time through online access. The online e-commerce program product 81 can include various functional modules including, for example, image processing and storage program product 83 which further includes an image processor 85 and a random image size generator 87. Note, the e-commerce program product 81 and image processing and storage program product 83 can be in the form of microcode, programs, routines, and symbolic languages that provide a specific set or sets of ordered operations that control the functioning of the hardware and direct its operation, as known and understood by those skilled in the art.

Figure 17:
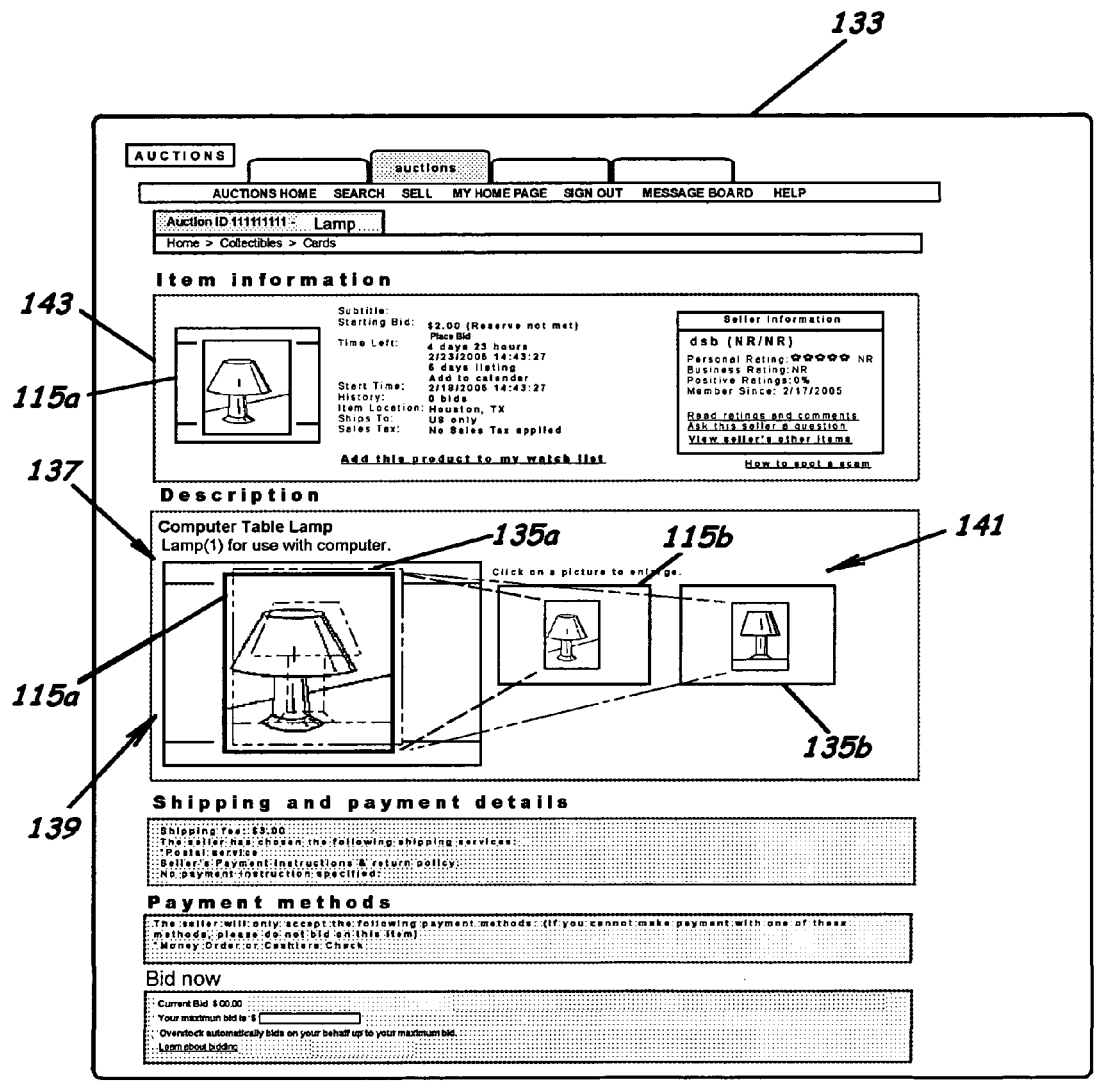
FIG. 17 is a schematic diagram of a seller of auction-format item web page to facilitate electronic commerce associated with an online marketplace website between a plurality of selling users and a plurality of potential buyers over a computer network according to an embodiment of the present invention.

The online e-commerce program product 81 can include instructions that, when executed by the marketplace administrator server 35, cause the marketplace administrator server 35 to selectively perform various operations, described as follows: The marketplace administrator server 35 can present or otherwise provide to a selling user web browser over the communication network 33 an item-creation form 91 (FIG. 3) for selling/auctioning a first auction or sale item $I_1$. A selling user S, preferably a previously registered user, accesses through the selling user computer 61, the item-creation form 91 accessible through the marketplace administrator server 35, to thereby create a seller item web page 133 (FIG. 17). The selling user S begins entering data in the item-creation form 91 to develop the marketplace item web page 133 to thereby provide item information for one or more associated marketplace items or items for sale hereinafter collectively referred to as items.

Figure 4:
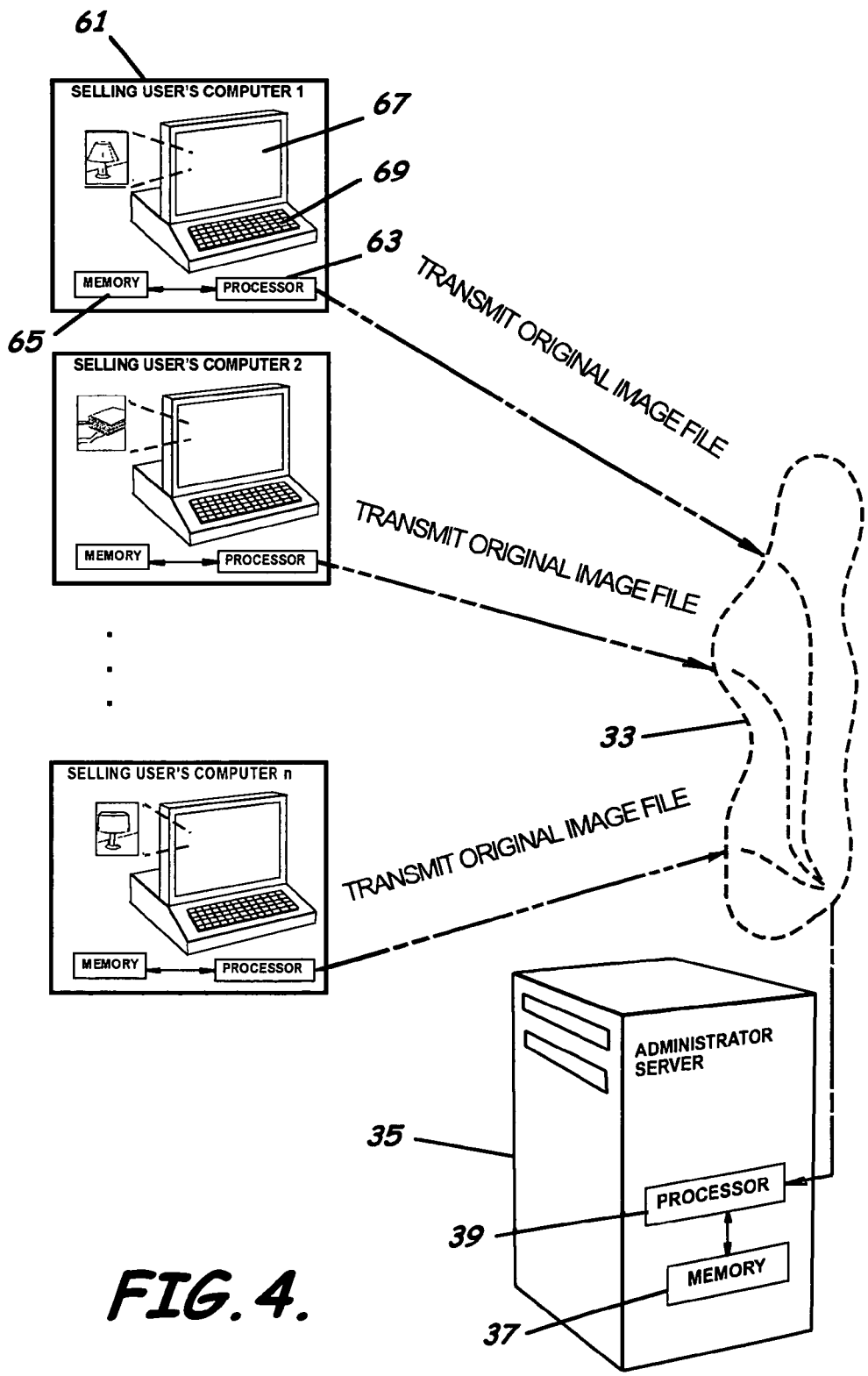
FIG. 4 is a schematic block diagram of a portion of a system to facilitate electronic commerce illustrating upload of an original image file over a computer network according to an embodiment of the present invention.
Figure 5:
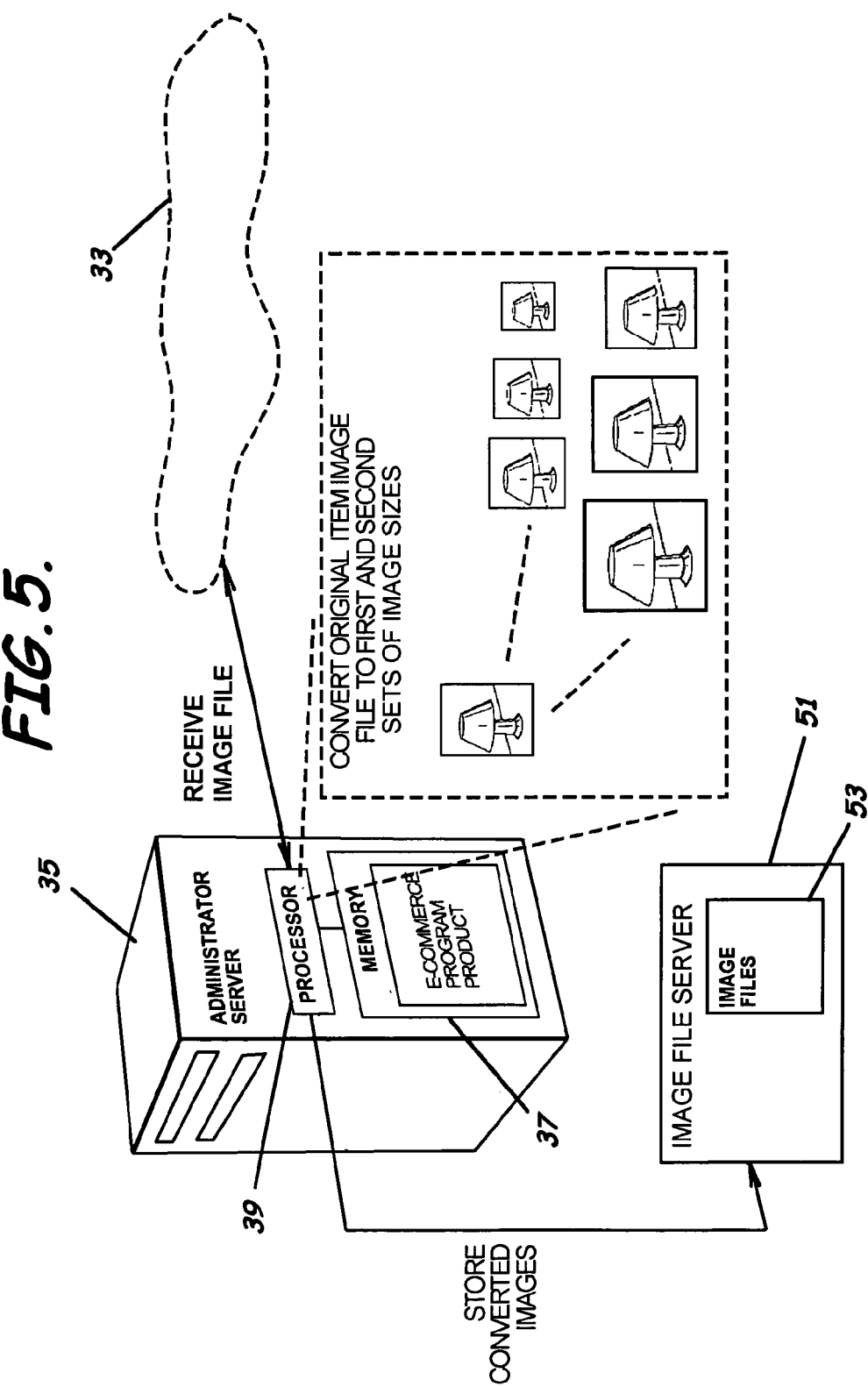
FIG. 5 is a schematic block diagram of a portion of a system to facilitate electronic commerce illustrating formation of at least two sets of scaled image files from an original image file over a computer network according to an embodiment of the present invention.

During form completion, the selling user S selects or otherwise uploads an original item image file 110 displaying an item image of the first item $I_1$ to be received by the marketplace administrator server 35 (see FIG. 4). This original item image file 110 can be identified, for example, by file location within a selling user computer 61 associated storage device or a uniform resource locator. In one configuration of this embodiment of the present invention, the uniform resource locator is that of a third-party service provider (not shown) that provides image services for one or more selling user S. The selling user S can provide an original item image file 110 of various items to be stored by the third-party service provider and/or edited to provide improved image quality, and therefore, enhanced marketing of the various items. Regardless of the location of the original item image file 110, once the item image file 110 is received by or otherwise provided to the remote marketplace administrator server 35, at least two or more sets of scaled first item images or image files, e.g., sets 113, 114, are generated, temporarily stored in, e.g., the image file server 51, and presented or otherwise provided to the selling user web browser (see FIGS. 5-6). The original item image file 110 can be discarded to conserve memory and reduce storage requirements.

Note, according to embodiments of the present invention, the original item image files 110 can be any type of digital image file that is capable of storing and transferring image data related to the auction item or other item for sale. Examples of suitable image files include Tagged Image File Format (TIFF), Joint Photographics Expert Group (JPEG), Audio Video Interleave (AVI), JPEG File Interchange Format (JFIF), Portable Network Graphics (PNG), Windows Bitmap Format (BMP), Portable Bitmap (PBM), Portable Greymap (PGM), Portable Pixmap (PPM), Adobe Photoshop (PSD), X BitMap (XBM), X PixMap (XPM), WordPerfect Graphics Metafile (WPG), Macintosh Picture (PICT), and the like. Other suitable types of image files will be apparent to those of skill in the art and are to be considered within the scope of the present invention. Note also, each of the images files in the image sets 113, 114, can be in the same format as that of the original image file 110, e.g., JPEG or GIF, so that if a JPEG image is provided then the image files in the sets 113, 114 can also be in JPEG.

The sets of scaled first item image files 113, 114, are produced in response to program instructions from an e-commerce program product 81 and/or an image processing and storage program product 83 stored in the memory 37 of the marketplace administrator server 35. As perhaps best shown in FIG. 6, the sets of scaled first item image files 113, 114, can provide categorical viewable image size variations of the item image, selectable by the selling user S, to thereby allow the selling user S to choose (select) a chosen item image 115a-117a, 115b-117b, best representing the first item $I_1$ preferably from each set 113, 114. One of the sets of scaled item image files 113, 114 which will be identified as the first set of scaled item image files 113 for illustrative purposes only, can provide a selection of relatively large images representing the item image of the first item $I_1$ to display an enlarged item image of the first item $I_1$. In this embodiment of the present invention, the first set of scaled item images 113 can be sized according to preselected values or sized randomly based on a specified size range. Regardless, the first set of scaled item image files 113 can range between 150 pixels by 150 pixels and 650 pixels by 650 pixels, preferably 250 pixels by 250 pixels and 400 pixels by 400 pixels, more preferably 275 pixels by 275 pixels and 325 pixels by 325 pixels, still more preferably 300 pixels by 300 pixels. The selling user S is provided an entry field such as, for example, a checkbox or other selection indicator, known by those skilled in the art, to allow selection thereof. Note, according to this embodiment, the item images are not distorted to fit the ranges described above, but rather are scaled so that the widest portion of the item image fits within one of the above described ranges. Note also, above described image size ranges are presented by way of example according to various embodiments of the present invention and should not be interpreted as limiting the viewing sizes only to the described ranges.

The second set of scaled first item images 114 can provide a selection of small images representing the item image of the first item $I_1$ and an entry field, e.g., checkbox, or other indicator to allow selection thereof. The chosen one of the second set of scaled first item images 114, when selected on, for example, the seller item web page 133 by a potential buyer B utilizing an input device, e.g., a mouse, can be provided to function as an icon selectable to send commands to the potential buyer computer 71 and/or remote marketplace administrator server 35 to display the chosen one of the first set of scaled item image files 113, to thereby display an enlarged image of the first item $I_1$ to the potential buyer B. The second set of scaled first item images 114 can be sized according to a preselected value or sized randomly based on a specified size range. Regardless, the second set of scaled first item image files 114 can range between 100 pixels by 100 pixels and 200 pixels by 200 pixels, preferably 100 pixels by 100 pixels and 125 pixels by 125 pixels, still more preferably 110 pixels by 110 pixels.

According to an embodiment of the present invention, the two or more sets of scaled item image files 113, 114, can additionally provide other image attribute variations of the item image of the first item $I_1$ (not shown), such as, for example, brightness, contrast, color enhancements, or other picture qualities known to those skilled in the art. These images, also can have categorical size variations, and can also be selectable by the selling user S to thereby allow the selling user S to choose an image having enhanced visual attributes that best represents the first item $I_1$.

After image selection by the selling user S of preferably one small image and one large image from the respective first and second sets of item image files 113, 114, a reference to the chosen small and large images (image files), or the image files themselves, can be incorporated in the item-creation form 91. The images (image files) not selected can be discarded to minimize storage requirements. If desired, the selling user S can select or otherwise upload another original item image file 110 displaying another view of the first item $I_1$ or, if the first item $I_1$ includes multiple sub-items, the selling user S can select or otherwise upload an original image file 110 for each of the sub-items of the first item $I_1$. For example, if the first item $I_1$ is an object such as a lamp having multiple versions, the selling user S could provide a chosen large 115a, 135a and chosen small digital image 115b, 135b (image file) (see FIGS. 16 and 17) for each version. If the first item $I_1$ is an ornamental three-dimensional object such as a statue, the selling user S could provide a chosen large and small digital image (image file) for each perspective view of the statute. Also for example, if the first item $I_1$ was a collection of coins, the selling user S could provide a digital image of the collection along with a digital image of each individual coin included in the collection.

Regardless of the number of original item image files 110 selected or otherwise uploaded by the selling user S, as with the first described original item image file 110, once each additional item image file 110 is provided to or otherwise received by the remote marketplace administrator server 35, two or more sets of scaled first item image files 113, 114, for each additional item image file 110 can be generated and provided for display.

Figure 8:
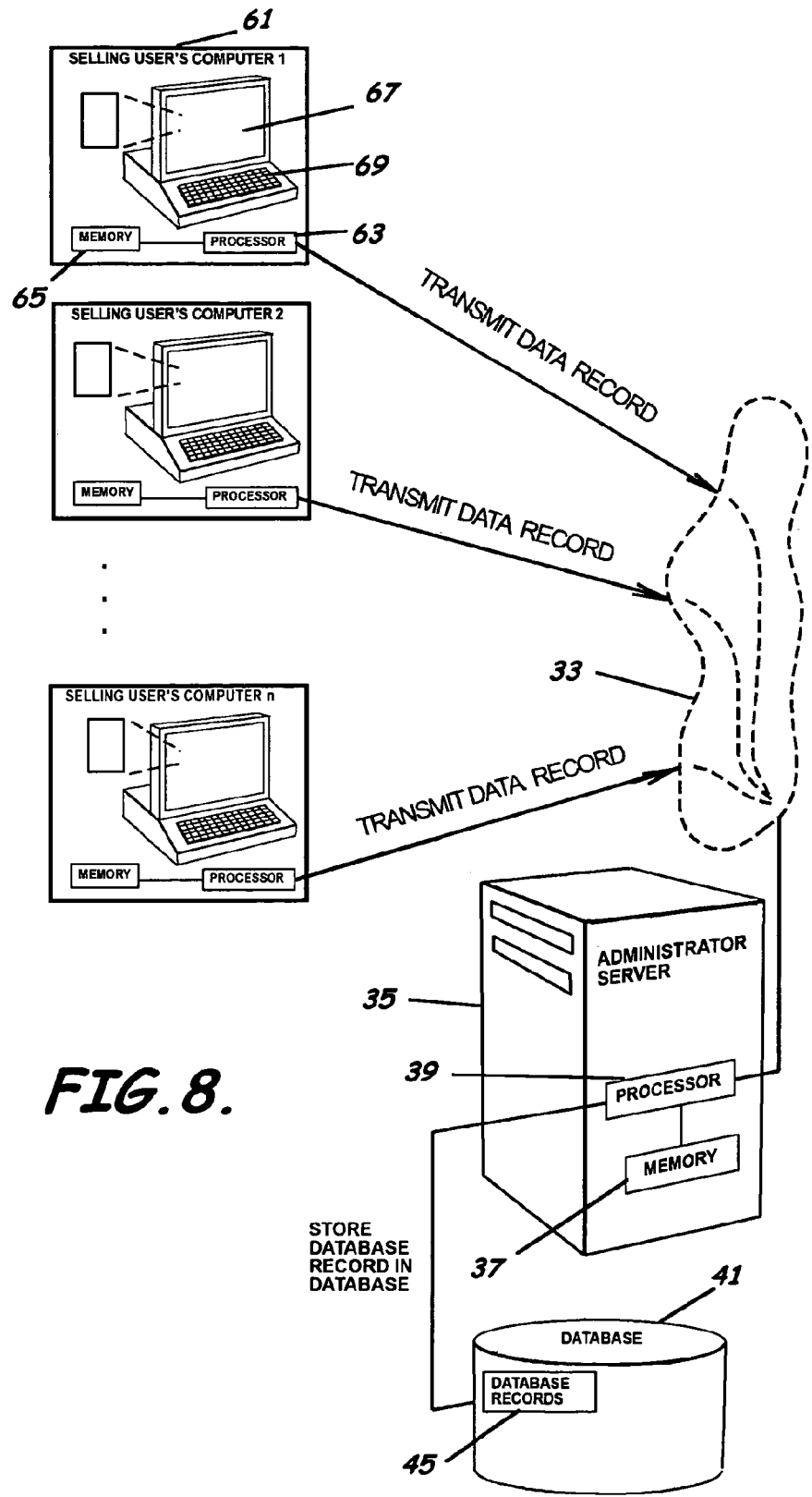
FIG. 8 is a schematic block diagram of a portion of a system to facilitate electronic commerce illustrating upload of data using the item-creation web page form illustrated in FIG. 3 according to an embodiment of the present invention.
Figure 9:
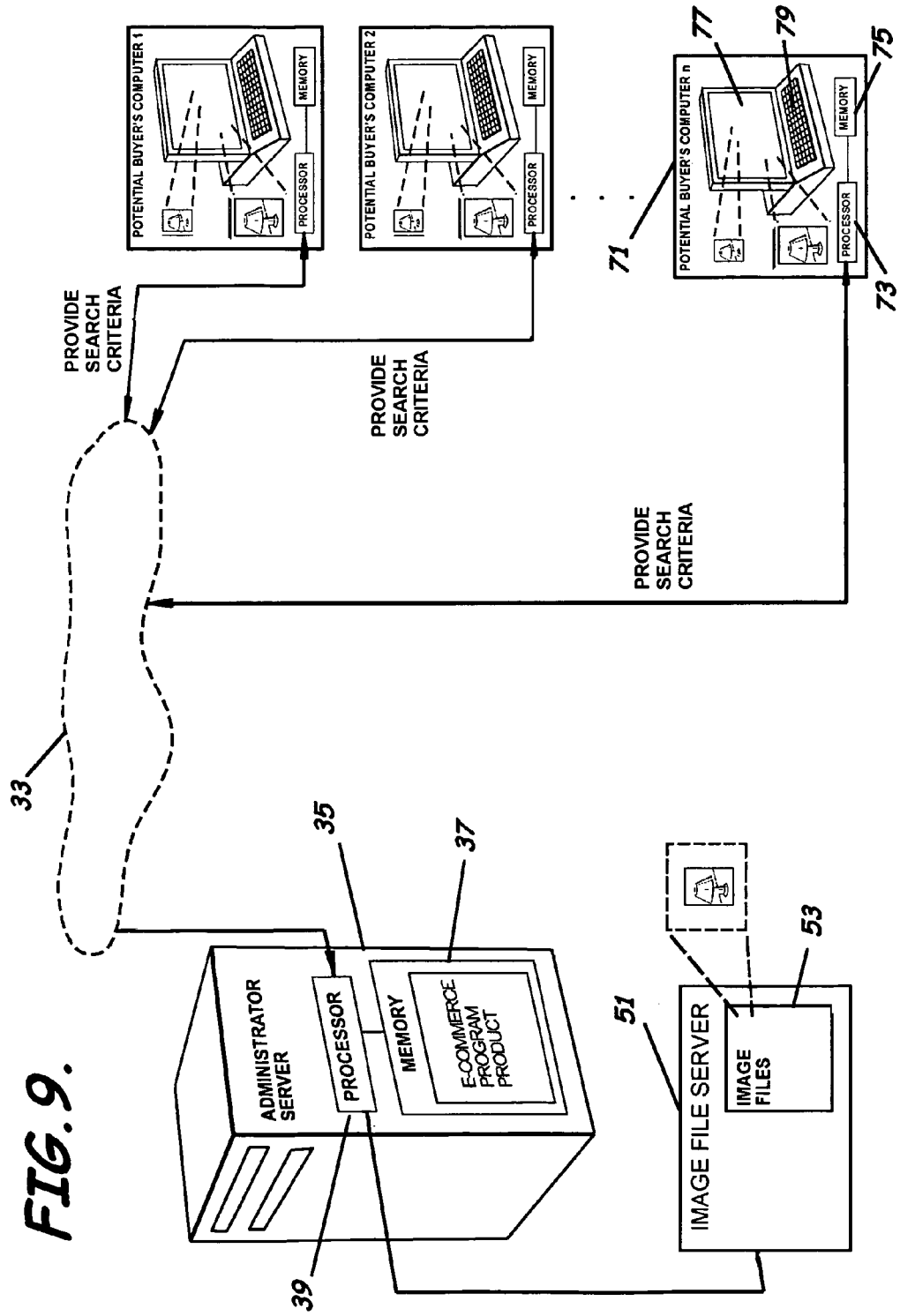
FIG. 9 is a schematic block diagram of a portion of a system to facilitate electronic commerce illustrating receiving search criteria for a plurality of items according to an embodiment of the present invention.

Further, either before, after, or partially before and after the selling user S selects or otherwise uploads the one or more original item image files 110 and chooses an appropriate image provided therefrom, the selling user S can enter data for other fields utilized to describe the various attributes of the first item I₁ and submit the item-creation form 91 (see FIG. 8). The item-creation form 91 can include fields such as: a main category and/or subcategories of the first item; a title and/or subtitle of the item; a physical location of the item, if applicable; pricing information; the item description; user selectable visual enhancements, i.e., highlighting; payment requirements; and shipping requirements and limitations (see, e.g., FIG. 3).

Upon submitting the completed item-creation form 91, associated data entered in the form is then sent over the computer network 33 from the selling user computer 61 to be received by the marketplace administrator server 35 of the on-line marketplace web site. The chosen small and large images can be somewhat more permanently stored, for example, in the image server 51 associated with the server 35 or other associated remote server. The seller item web page 133 (FIG. 17) is then able to be created that can include instructions to display each chosen small image and a default one of the selected large images. The seller item web page 133 can then be presented or otherwise made available to be viewed by the potential buyer B.

According to an embodiment of the present invention, and as perhaps best shown in FIG. 17 and as noted above, the seller item web page 133 can provide item information such as, for example, an item identification number, title, subtitle, starting price, time remaining until expiration, start time, history, item location, shipping restrictions, and sales tax requirements. The seller item web page 133 also can provide a functional link to allow, e.g., the item I₁, to be added to a potential buyer's watch list so that the potential buyer B can monitor the status of the item I₁, and a functional link to allow the item I₁ to be placed on a potential buyer's calendar so that the potential buyer B can better visualize listing expiration dates for various items of interest to the potential buyer B. The seller item web page 133 can also include selling user information including, for example, a personal rating, business rating, percent of positive ratings, repeat rating, membership status, ratings and comments about the selling user S, and other information known to those skilled in the art. The seller item web page 133 further can include a link to the selling user S to advantageously provide the potential buyer B an ability to request additional information about the item I₁. Further, advantageously, this functionality can provide a preformatted automated e-mail to the selling user S whereby the subject, greeting, and/or closing are already provided and the potential buyer B need only enter a question in a provided text entry field (not shown) in order to provide such question to the selling user S.

In an embodiment of the present invention, in order to minimize the size of the seller item web page 133, an item description section 137 of the web page 133, for example, can provide a single large image viewing location 139 to display each large image 115a, 135a, provided by the selling user S for the first item I₁, and a separate location 141 for each associated small image 115b, 135b, provided by the selling user S. That is, the seller item web page 133 can display each selected small image 115b, 135b, which preferably functions to allow a potential buyer B to select and view the corresponding large image 115a, 135a, of each view represented by the selling user selected small images 115b, 135b, respectively. Also, each displayed small image 115b, 135b and/or the displayed large image 115a, 135a, according to an embodiment of the system 30, can be presented in different sizes and different locations within the web page 133 as scaled by the browser of the potential buyer computer 71. Further, in order to standardize the layout of the various seller item web pages 133 among different selling users S, in an embodiment of the present invention, an item information section 143 is provided that includes a standardized image of the first item I₁, preferably in the form of the chosen large image 115a but adjusted to a standard size such as, for example, preferably 125 pixels by 125 pixels to 175 pixels by 175 pixels, and more preferably 150 pixels by 150 pixels.

In order for a potential buyer B to readily access the seller item web page 133, the system 30 through, for example, the online marketplace, can provide the potential buyer B a keyword or item number search function whereby the potential buyer B may enter search criteria (see FIG. 9) such as, for example, key words matching those in, for example, an item's title, subtitle, or description, or the item number of the item assigned to the respective item by the marketplace administrator server 35. This search can be conducted in either all predetermined item categories or a subset thereof. The online marketplace can also provide the potential buyer B a search function based on selling user identification (e.g. user name) which can display all items associated with a particular selling user S. The online marketplace can further provide the potential buyer B a refined keyword or item number search function, whereby the potential buyer B is further provided search limiting fields such as, for example, minimum price, maximum price, item category, and/or selling user identification.

In response to receiving the search criteria presented by a potential buyer web browser, the e-commerce program product 81, e.g., through the marketplace administrator server 35, can access the item data records 45 of a respective plurality of items satisfying the search results criteria, to thereby determine various attributes, such as an associated item title for each of the plurality of items satisfying the search results criteria and an item image file name or location of a chosen item image file, e.g., image file 115a or 115b, for each of the items satisfying the search results criteria. Having determined the attribute data and the image location and/or identification of one of the chosen item image files associated therewith for each of the of items satisfying the search results criteria, the e-commerce program product 81, through the marketplace administrator server 35, can provide such data to the potential buyer web browser along with instructions (see FIG. 10) to display a search results web page 131 (see, e.g., FIG. 14) including those to display within the search results web page 131, for example, each item title and at least one of the chosen item images for each item image satisfying the search criteria. The potential buyer web browser can then request and be provided each of the chosen item images for each item image satisfying the search criteria according to the provided instructions (see FIGS. 11-12). According to the provided instructions, the potential buyer web browser can then resize the provided chosen item images (see FIG. 13) to be displayed in a table of items satisfying the search results criteria (see FIG. 14).

Figure 15:
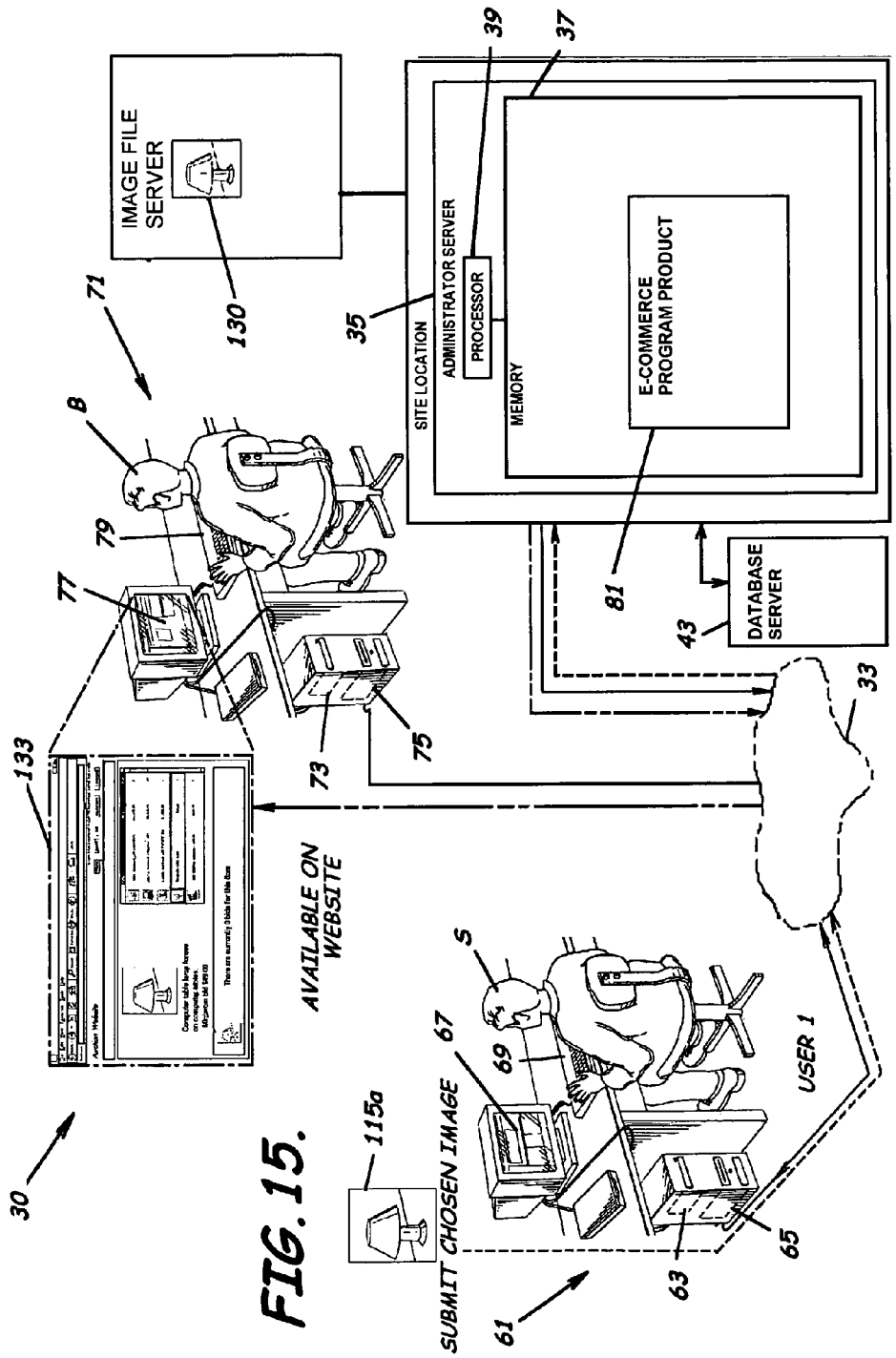
FIG. 15 is a schematic diagram illustrating a feature that enables a seller user to upload data about an item and enables potential buyers to view the item data upon uploading the data in accordance with an embodiment of the present invention.
Figure 16:
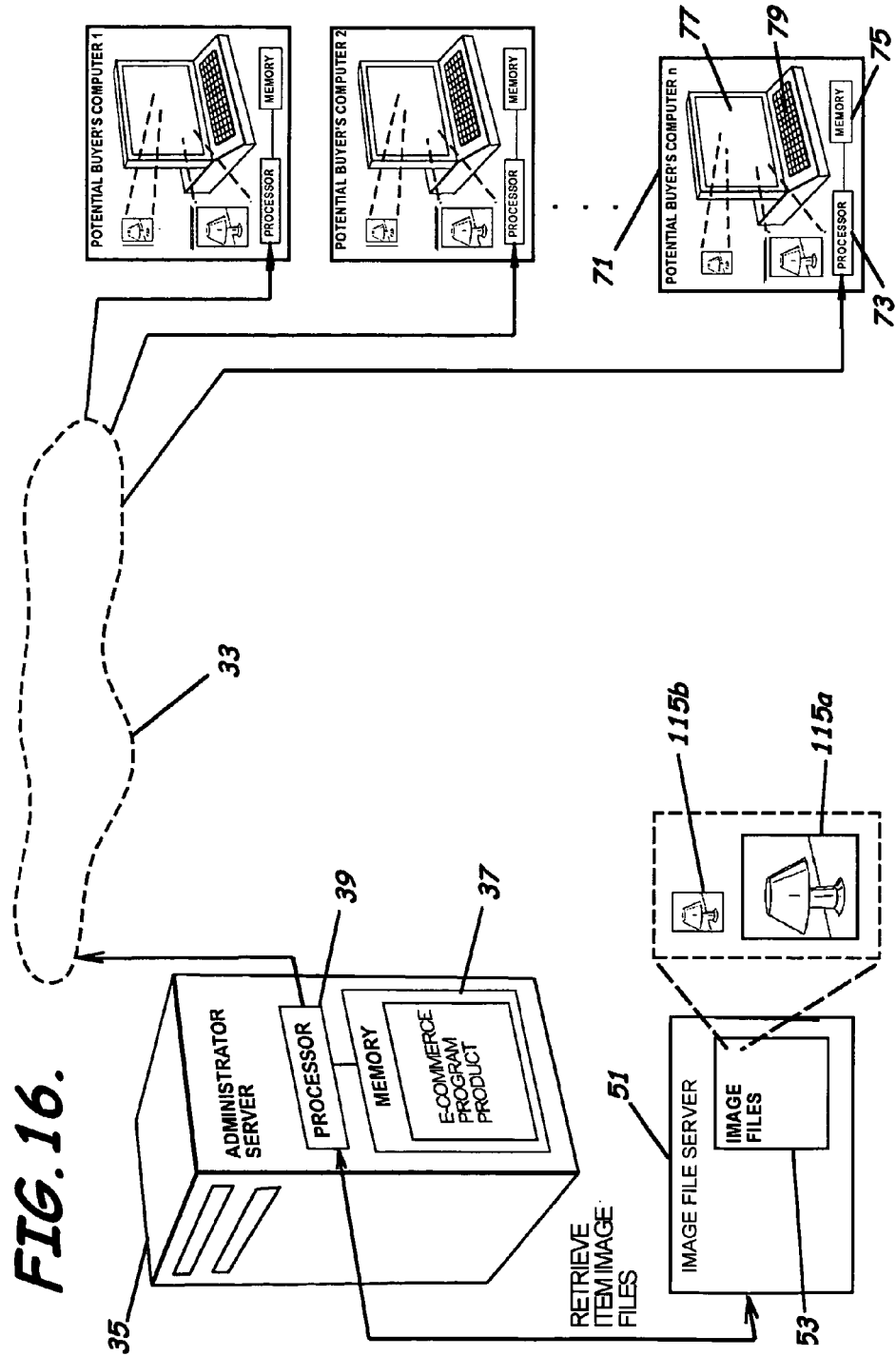
FIG. 16 is a schematic block diagram of a portion of a system to facilitate electronic commerce illustrating providing a potential buyer computer at least two chosen randomly generated image files according to an embodiment of the present invention.

Regardless of search methodology employed, according to an embodiment of the present invention, the search results web page 131 can include, for example, a standardized layout of the various items provided by different selling users S. This search results web page 131 can further include hyperlinks to each of the various seller item web pages 133 satisfying the search methodology criteria associated with the respective titles of the items. The search results can also include icons 132 each providing a hyperlink to each respective seller item web page 133 having an item satisfying the search methodology criteria. Each icon can be displayed in the form of the chosen item image, e.g., image file 115a or 115b, for each respective seller item web page 133, adjusted to a standard size such as, for example, 65 pixels by 65 pixels. As shown in FIGS. 15-17, upon access of either hyperlink by the potential buyer B, a seller item web page 133 associated with the selected image is presented, the respective item data is received, and the chosen item images, for example, image files 115a, 115b, are retrieved and displayed. Note, as shown in FIG. 17, one or more of the chosen large and/or small item image files, e.g., image file 115a or 115b, can be resized for use in different sizes in different locations on the seller item web page 133, in conformity with the potential buyer web browser.

According to an embodiment of the present invention, similarly, a second selling user S' (see FIG. 6) can upload an original item image file 120 displaying an item image of a second item $I_2$, to be received by the marketplace administrator server 35. One or more but preferably at least two or more sets of scaled second item image images or image files, e.g., sets 123, 124, are generated, temporarily stored in, e.g., the image file server S1, and presented or otherwise provided to the selling user web browser, with the original item image file 120 being discarded to conserve memory and reduce storage requirements. The sets of scaled second item image files 123, 124, can provide categorical image size variations of the item image, selectable by the second selling user S', to thereby allow the second selling user S' to choose (select) a chosen item image, e.g., images 125a-127a, 125b-127b, from each set 123, 124, best representing the second item $I_2$.

After image selection by the second selling user S' of preferably one small image and one large image from the respective first and second sets of item image files 123, 124, a reference to the chosen small and large images (image files), or the image files themselves, can be incorporated in the item-creation form 91, with the images (image files) 125a-127a and 125b-127b not selected discarded to minimize storage requirements. Upon submitting the completed item-creation form 91, the chosen small and large images can be somewhat more permanently stored and a seller item web page 133 for the second item including instructions to display the chosen small image and/or large images can then be presented or otherwise made available to be viewed by a plurality of potential buyer B.

Figure 6:
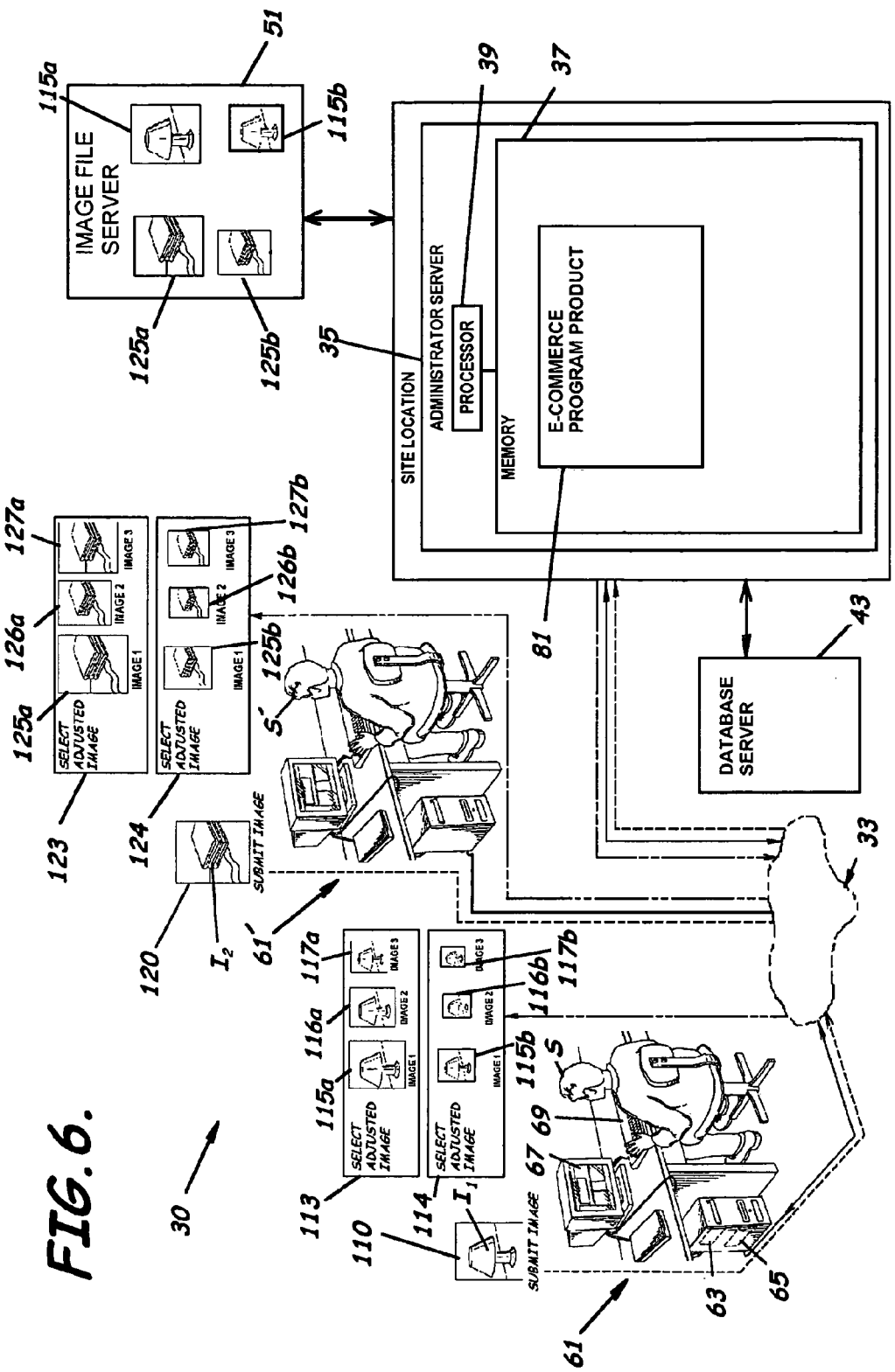
FIG. 6 is a schematic block diagram of a portion of a system to facilitate electronic commerce illustrating formation of at least two sets of scaled image files from an original image file over a computer network according to an embodiment of the present invention.

As shown in FIGS. 1, 6, and 15, according to another embodiment of the present invention, a system 30 to facilitate electronic commerce, on an online marketplace including auction website, between a selling user computer 61 and the potential buyer computer 71 over the computer network 33 is advantageously provided. In this embodiment, the system 30 preferably includes a host computer accessible to the computer network 33 to host the online marketplace website to thereby define an marketplace administrator server 35. The administrator server 35 preferably includes a processor 39 and memory 37 coupled to the processor 39 to store operating instructions therein. The operating instructions can include e-commerce program product 81 and image processing and storage program product 83 including an information processor 85 and a random image size generator 87 that can enable the random image size generation function, as described previously.

The e-commerce program product 81 provides instructions to perform the operation of hosting the online marketplace website to thereby facilitate e-commerce between a plurality of selling user and potential buyers. The image processing and storage program product 83 can provide instructions to perform the operation of processing data received through an item-creation form 91 supplied to a selling user S to thereby form a seller item web page 133 to thereby provide access and advertisement of the various items hosted by the online marketplace website. The image processing and storage program product or software 83 can also include instructions to perform the operation of providing scaled item image files, e.g., image files 115a, 116a, 117a, or sets of scaled item image files, e.g., sets 113, 114, depending upon the configuration. The information processor 85, which can be implemented as either a component of the image processing and storage program product 83 or an independent program product, includes instructions to perform the operation of processing item data provided by the selling user S. Also depending upon the desired configuration, the random image size generator 87 is preferably in communication with the information processor 85 to randomly size associated item images uploaded by the selling user S.

The system 30 preferably also includes a database 41 or a set or grouping of databases, as shown in FIG. 1, accessible to the processor 39 of the administrator server 35. The database 41 is preferably stored in or otherwise associated with the memory 37 of the administrator server 35 or stored in other suitable data storage media accessible to the administrator server 35. The database 41 can also be provided in the form of a database server 43 or server cluster. The particular database configuration is replicated based on capacity requirements for the system 30. The database 41 preferably includes database records 45 related to a first item $I_1$, to be sold by the selling user S. As described previously, the system 30 can include database records 45 of more than one item, e.g., items $I_1$, $I_2$. Also, a set of machine-readable instructions or computer auction/sales software, e.g., online marketplace e-commerce program product 81, is advantageously stored in the memory 37 of the administrator server 35 to cause the administrator server 35 to form, via the computer network 33, a community of electronically interconnected users, e.g., S, B, S', to facilitate e-commerce.

According to an embodiment of the present invention, the marketplace administrator server is actually a module having separate types of machines in order to provide processing/server capability for two functionalities. One of these functionalities is that of web/application processing, and the other is that of database processing. The web/application requirements functionality of the server can be furnished by a web/application server. Suitable units for this purpose are in the form of, for example, an appropriate number of Dell® 1750 servers with dual CPUs, 1 GB RAM, and mirrored hard drives. The web/application servers can be connected to a database server or server cluster that provides the database functionality. Database servers suitable for this purpose are, for example, Dell® 2650 servers with dual CPU and 10 GB RAM. The database servers or server module are attached to a high performance storage device.

It should be understood that the specific server identified above is given by way of example and that other types of servers or computers can be used. The server or servers shown schematically at 35, 41, and 51, each represent a server or server cluster or server farm in the architecture and are not limited to any individual physical server. The server site or sites may be deployed as a server farm or server cluster managed by a serving hosting provider. The number of servers and their architecture and configuration may be increased based on usage, demand and capacity requirements for the system 30.

As shown in FIGS. 1, 6, and 15, the system 30 includes a selling user computer 61 positioned at a selling user site remote from the administrator server 35 and accessible to the computer network 33. The selling user computer 61, defining the seller user S, preferably has a processor 63 and memory 65, a display 67, and a user interface 69 that are all coupled to the processor 63. The memory 65 is used to store operating instructions therein. The display 67 is used to display images. The user interface 69 provides the selling user S with access to manipulate the stored operating instructions.

In addition to the selling user computer 61, the system 30 advantageously includes a potential buyer computer 71 positioned at a potential buyer user site remote from the administrator server 35 and accessible to the computer network 33. The potential buyer computer 71 defines the potential buyer B (see FIG. 15). The potential buyer computer 71 preferably has a processor 73 and memory 75, a display 77, and a user interface 79 all coupled to the processor 73. The memory 75 is used to store operating instructions therein and to receive database records therein. The display 77 is used to display images. The user interface 79 provides the potential buyer B with access to manipulate the operating instructions and received database records.

The selling user computer 61 and the potential buyer computer 71 are preferably interconnected through the administrator server 35 to the computer network 33 thereby establishing a community of electronically interconnected users based on electronic commerce transactions through the administrator server 35. More than one selling user and more than one potential buyer can be electronically interconnected to the system to expand the community of electronically interconnected users. As used herein, both the selling user S and the potential buyer B can be individuals or companies. They can be selling individual items on their own behalf or items on behalf of one or more companies. The methods and systems described herein can be used in person-to-person sales transactions, as well as, person-to-business, business-to-person, and business-to-business e-commerce transactions.

According to embodiments of the present invention, the system 30 described herein can also include a user interface (not shown) that is coupled to the processor 39 of the administrator server 35. The user interface provides user access to manipulate the operating instructions and access data records 45.

Figure 22:
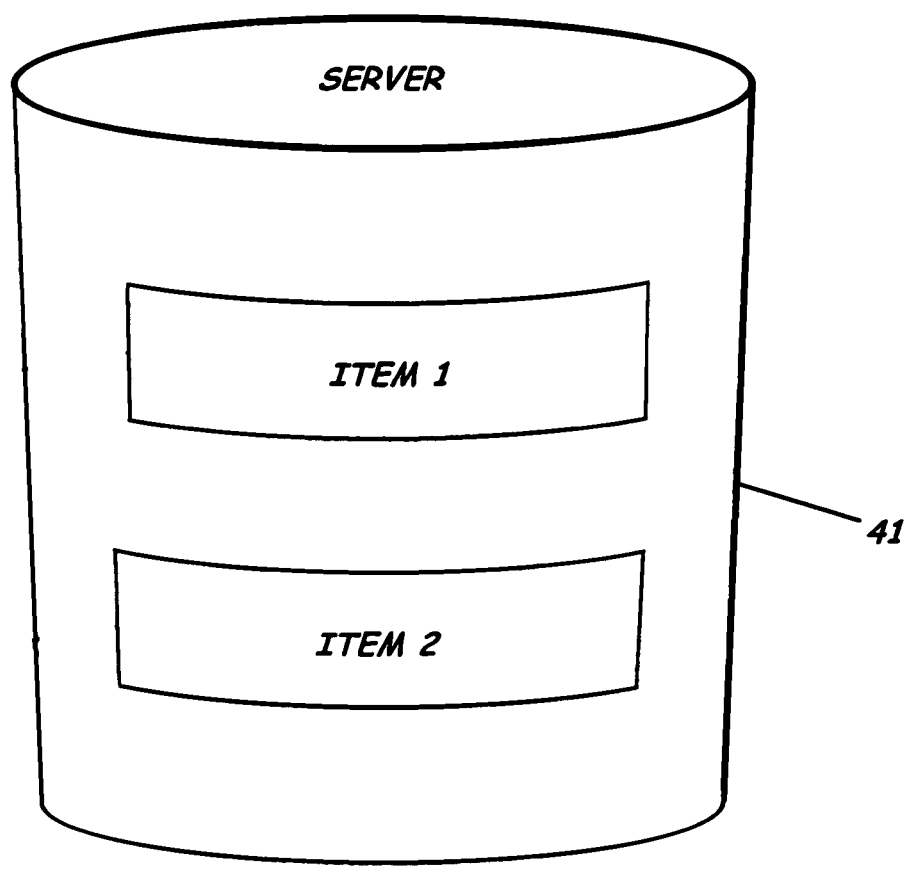
FIG. 22 is a block diagram of a database containing information related to selling users and potential buyers on an online marketplace and information related to an item that the selling user wants to sell according to an embodiment of the present invention.

As another embodiment of the present invention, a system 30 to facilitate electronic commerce over a computer network 33 is advantageously provided. In this embodiment, the system 30 preferably includes a host computer at a selected host website that is accessible to the computer network 33 to define an administrator server 35. The administrator server 35 preferably has memory 37 coupled to the processor 39 to store operating instructions therein. The system 30 also include a random image size generator 87 that is advantageously in communication with the information processor 85 to randomly size images uploaded by the selling user S. The system 30 also preferably includes a database 41, as shown in FIG. 22, accessible to the processor 85 of the administrator server 35 that includes a database record or records related to a first item $I_1$ of the selling user S. A set of machine-readable instructions or computer auction/sales software or program product such as, for example, in the form of e-commerce program product 81, can be stored in the memory 37 of the administrator server 35. The set of machine-readable instructions can cause the administrator server 35 to form a community of electronically interconnected users of the computer network 33 to facilitate e-commerce.

Figure 7:
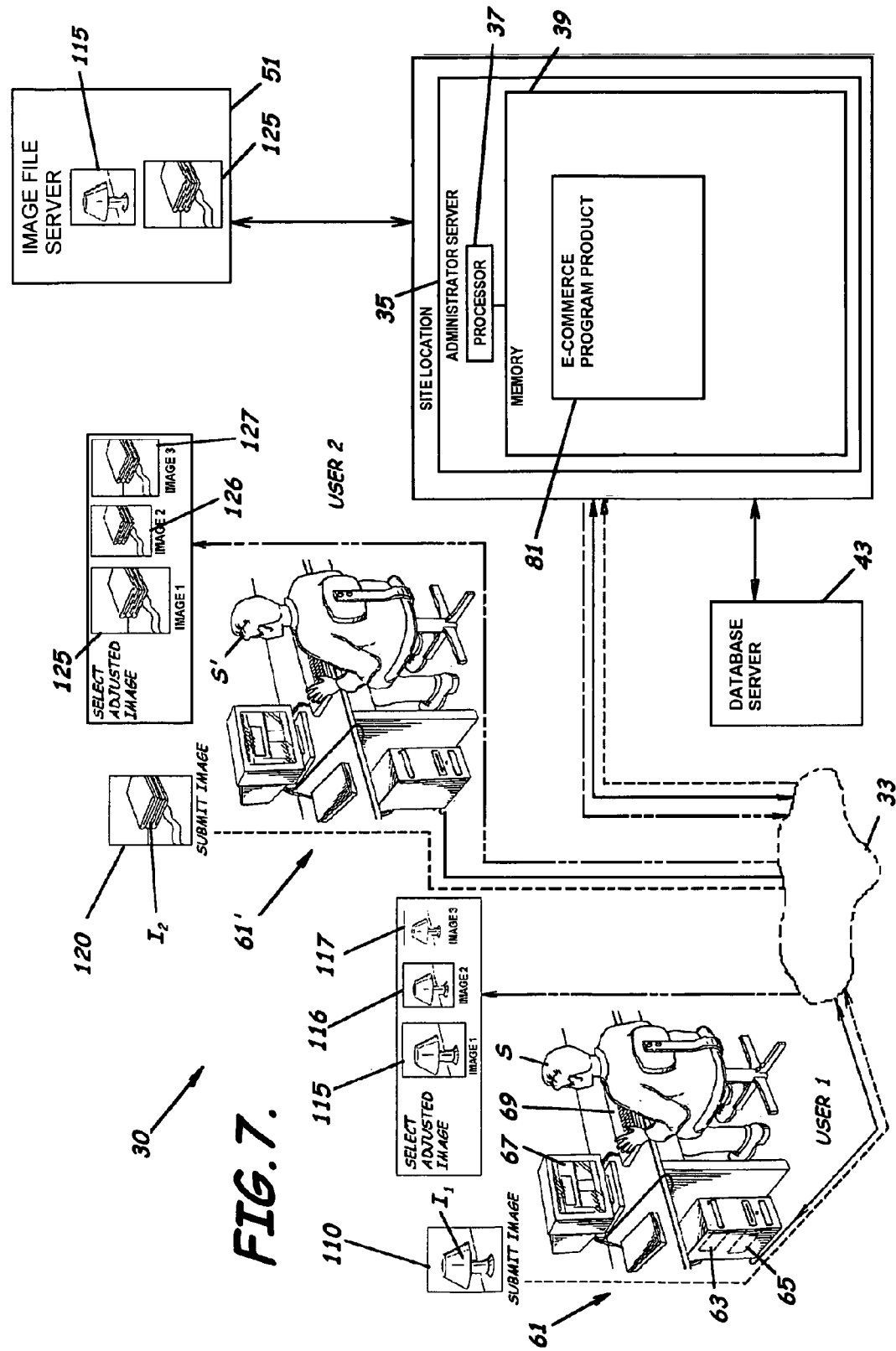
FIG. 7 is a schematic block diagram of a portion of a system to facilitate electronic commerce illustrating formation of at least two scaled image files from an original image file according to an embodiment of the present invention.

As shown in FIGS. 1, 7, and 15, the system 30 preferably includes a selling user computer 61 positioned at a selling user location remote from the administrator server 35 and accessible to the computer network 33. The selling user computer 61 preferably defines a selling user S. The selling user computer 61 preferably has a processor 63, memory 65, a display 67, and a user interface 69. The memory 65 is coupled to the processor 63 to store operating instructions therein. The memory 65 is also used to send data records related to an item $I_1$ and select at least one chosen first item image, e.g., images 115 (see FIG. 18) developed from the first item image 110 (see FIG. 7) and selected from a randomly sized image 115, 116 that is generated by the random image size generator 87 of the item $I_1$. The display 67 is coupled to the processor 63 for displaying images. The user interface 69 is also coupled to the processor 63 and is used to provide the selling user S with access to manipulate the stored operating instructions.

In addition to the selling user computer 61, this system embodiment includes a potential buyer computer 71 that is positioned at a potential buyer user site that is remote from the administrator server 35 and is accessible to the computer network 33, as shown, for example, in FIG. 15. The potential buyer computer 71 defining the potential buyer B. The potential buyer computer 71 preferably includes a processor 73, memory 75, a display 77, and a user interface 79.

The memory 75 is preferably coupled to the processor 73 to store operating instructions therein and to receive and store data records therein. The display 77 is coupled to the processor 73 and is used for displaying images. The user interface 79 is also coupled to the processor 73 and provides the potential buyer B with access to manipulate the operating instructions and the received data records.

As in other system embodiments of the present invention, the selling user computer 61 and the potential buyer computer 71 are interconnected through the administrator server 35 to the computer network 33 to establish a community of electronically interconnected users based on electronic commerce transactions through the administrator server 35. The selling user S and the potential buyer B advantageously generate commercial e-commerce transactions between the users. The e-commerce transactions can be auction sales or direct sales, as described herein.

According to embodiments of the present invention, the system 30 interfaces the computer area network or Internet 33 by communicating through the administrator server 35, and a plurality of remote user computers, e.g., computers 61, 71, in communication with the computer network or Internet 33. The plurality of remote user computers 61, 71 are positioned remote from the administrator server 35 each at a user site, and are positioned to access the administrator server 35. The user computer 61, 71, is typically a personal computer and can be connected over the Internet through a variety of configurations, such as through a stand-alone computer with individual access, or through a local area network (LAN) or wide area network (WAN). Access to the administrator server 35 by the user computers 61, 71, can be made by a variety of communication links such optical cable, a wireless network such as a cellular network, satellite network or other access media.

When in communication with the administrator server 35 through the computer network 33, the remote user computers 61, 71, can access the operating instructions or program product 81, 83 for various purposes. The remote user computers 61, 71, can retrieve records from the server database 41 for display and user manipulation. The system 30 can also include still other devices, such as a portable computer, a PDA, a mobile telephone, and still other devices for accessing the Web, that are adapted to interface with the computer network 33 while positioned remote from the administrator server 35.

In addition to the methods and systems described herein, the present invention also advantageously provides a computer memory element containing, stored in signal bearing media, a database such as database 41, for example, that shown in FIG. 22. Note, the computer memory element can include but is not limited to the various volatile and nonvolatile forms of memory used in conjunction with a computer or processor such as, for example, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types. The database 41 preferably contains data in computer readable format indicating a community of electronically interconnected users of a publicly accessible computer network 33. The database 41 also preferably includes data indicating a description of each marketplace item, e.g., $I_1$, $I_2$, respectively, including at least two randomly sized images, e.g., images 115, 116, and 125, 126, or reference hereto of each marketplace item $I_1$, $I_2$, respectively, generated from an original image 110, 120 of the item $I_1$, $I_2$, supplied by the respective selling user S, S'. These at least two images, e.g., image files 115, 116, and 125, 126, respectively, are chosen by the selling user S from among a plurality of images generated via an automated process. Correspondingly, the plurality of images can be are generated by scaling the original image 110, 120, to a corresponding plurality of sizes randomly sized within preselected size ranges.

Figure 18:
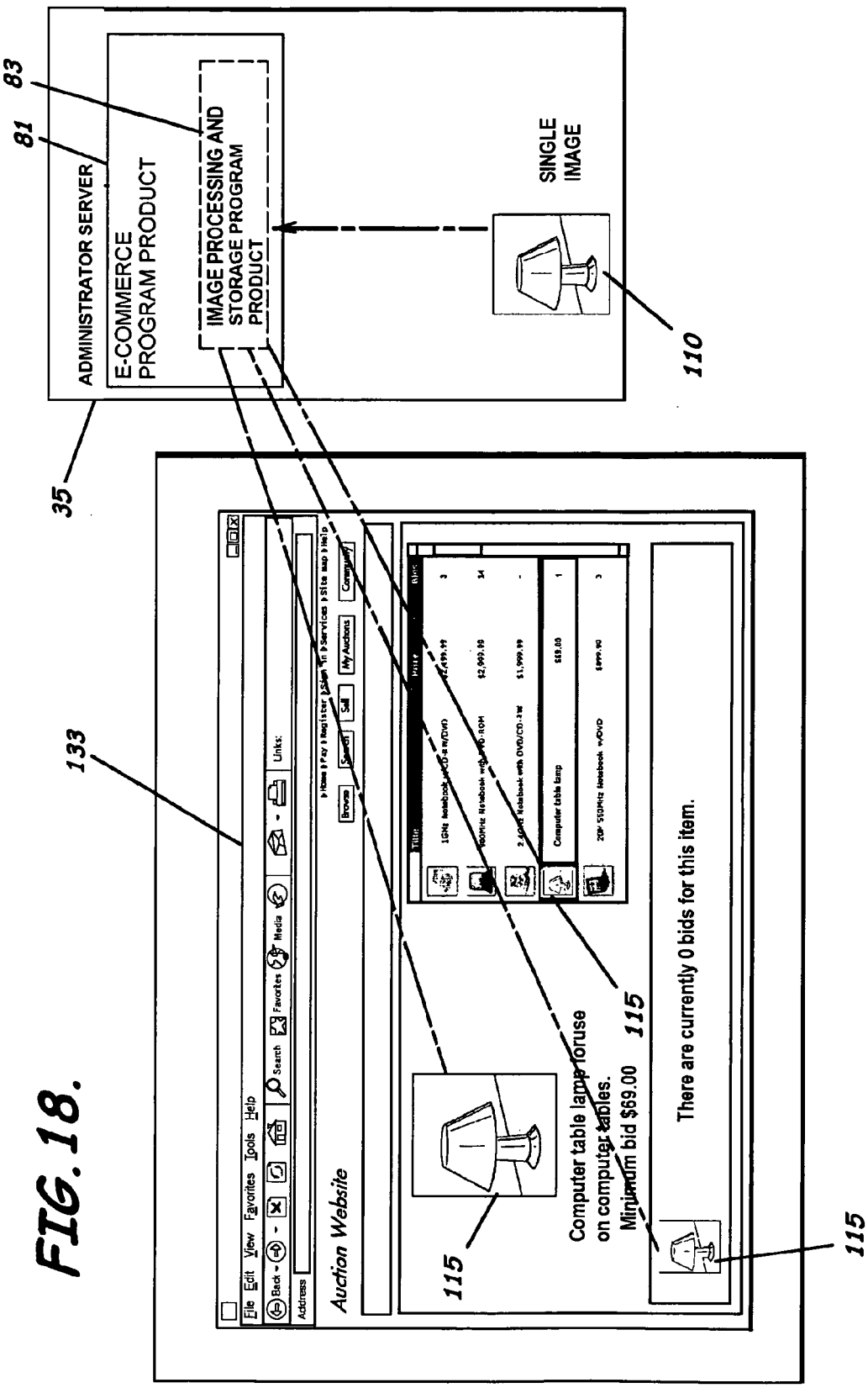
FIG. 18 is a schematic diagram illustrating use on an online auction-format web page of images selected from at least two scaled images and in different sizes and different places on the web page according to an embodiment of the present invention.
Figure 19:
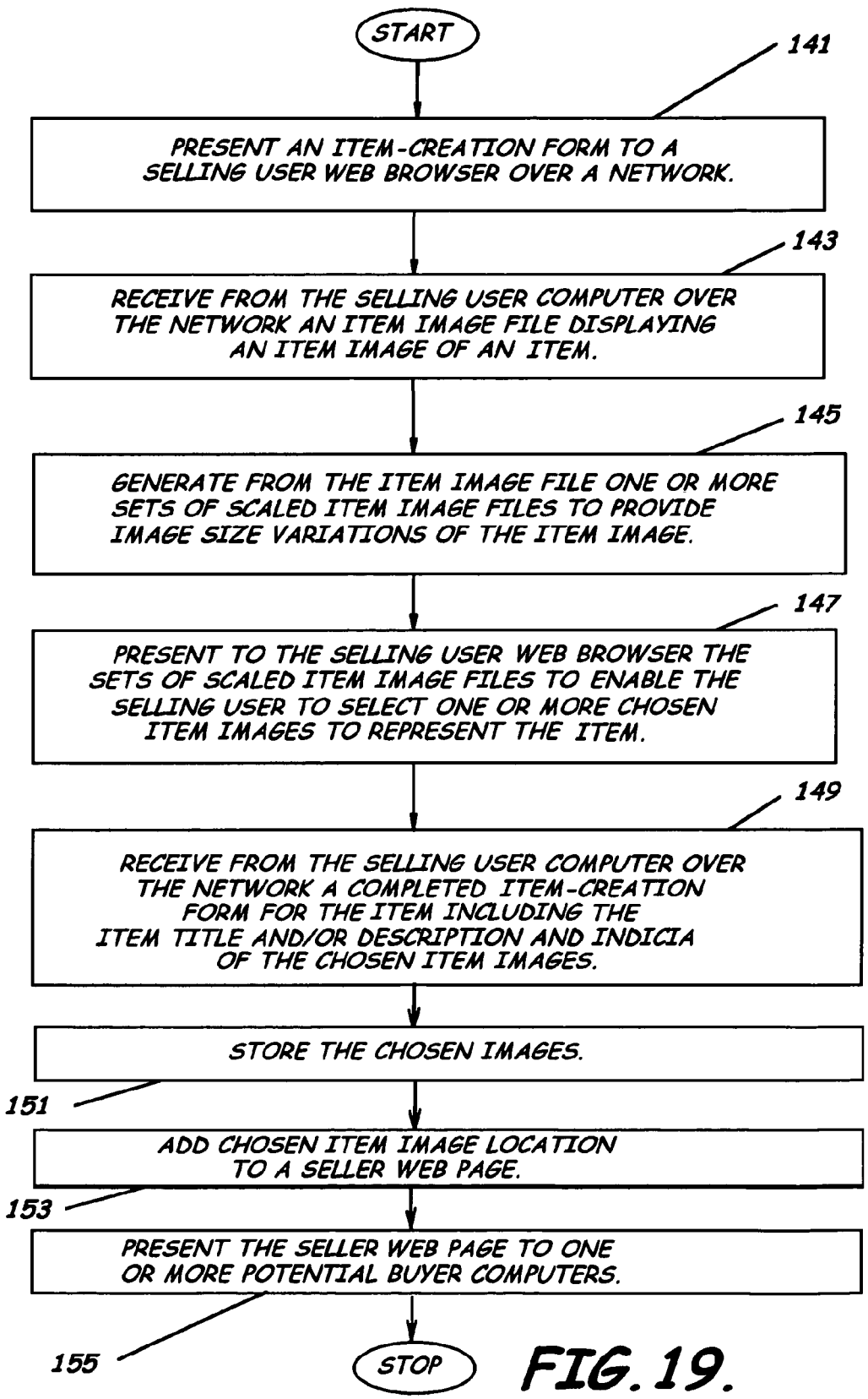
FIG. 19 is a block flow diagram illustrating a method of facilitating electronic commerce on an online marketplace website between a selling user computer and a potential buyer computer over a computer network according to an embodiment of the present invention.

As shown in FIGS. 1-22, embodiments of the present invention advantageously provide methods of facilitating e-commerce between a plurality of selling users and a plurality of potential buyers over a communication network. In an embodiment of a method of facilitating e-commerce, as shown in FIG. 19 and shown in FIGS. 1 and 3, an item-creation form 91 for selling a first item $I_1$ is presented to a selling user web browser over the communication network 71 (block 141). A selling user S, preferably a previously registered user, accesses through the selling user computer 61 an item-creation form 91 accessible through an online auction/product sale website's remote marketplace administrator server 35, to thereby create a seller item web page 133 (FIG. 17). The selling user S begins entering data in the item-creation form 91 to develop the seller item web page 133 to thereby provide information for one or more associated marketplace items or items for sale. Note, although illustrated and described with respect to providing auction services, embodiments of the present invention are equally applicable to direct product/service sales.

During form completion, the selling user S selects or otherwise uploads an item image file, e.g. image file 110 displaying an image of the first item $I_1$ (block 143) to be received by the marketplace administrator server 35 (see also FIG. 4). This original item image file 110 can be identified by file location or address within a selling user computer 61 associated storage device or uniform resource locator associated with either a seller website or that of a third-party service provider. Regardless of the location of the item image file 110, and as perhaps best shown in FIGS. 5 and 6, once the item image file 110 is accessed by or otherwise provided to the remote marketplace administrator server 35, one or more but preferably at least two sets of scaled item image images or image files 113, 114, are generated from the original item image file 110 (block 145) and presented to the selling users web browser (block 147). The original item image 110 can be discarded to conserve memory and reduce storage requirements. Note, the item image files can be of various types of digital image files known to those skilled in the art that are capable of storing and transferring image data related to the item. Note also, each of the images in the image sets 113, 114, can be in the same format, e.g., JPEG or GIF, so that if a JPEG image is provided then the respective generated files displaying variations and sizes in JPEG.

The sets of scaled item image files 113, 114, can be produced or otherwise generated in response to program instructions from an e-commerce program product 81 and/or an image processing and storage program product 83 stored in the memory 37 of the marketplace administrator server 35. The sets of scaled item image files 113, 114, can provide categorical image size variations of the item image 110, selectable by the selling user S, to thereby allow the selling user S to select an image 115a-117a, 115b-117b (see FIG. 6), from at least one but preferably both sets 113, 114, best representing the first item $I_1$.

The first set of scaled first item image files 113 can, for example, provide a selection of relatively large images representing the item image 110 of the first item $I_1$ to display an enlarged item image 110 of the first item $I_1$. In this embodiment of the present invention, the first set of scaled first item images 113 can be sized according to preselected values or sized randomly based on a specified size range. Regardless, as described previously, the first set of scaled first item images 113 can range between 150 pixels by 150 pixels and 650 pixels by 650 pixels, preferably 250 pixels by 250 pixels and 400 pixels by 400 pixels, more preferably 275 pixels by 275 pixels and 325 pixels by 325 pixels, still more preferably 300 pixels by 300 pixels. As noted previously, these ranges, and those described below, are presented by way of example according to various embodiments of the present invention and should not be interpreted as limiting the viewing sizes only to the described ranges. The selling user S is provided an entry field such as, for example, a checkbox or other selection indicator, known by those skilled in the art, to thereby select such chosen item image from the image set 113.

The second set of scaled first item images 114 can provide a selection of relatively small images representing the item image 110 of the first item $I_1$, and an entry field or other indicator to allow selection thereof. The chosen one of the second set of scaled first item images 114, when displayed on a seller item web page 133, such as that shown in FIG. 17, and accessed by a potential buyer B utilizing an input device for a potential buyer computer 71, preferably functions as an icon selectable to send commands to the potential buyer computer 71 and/or remote marketplace administrator server 35 to display the selected one of the first set of scaled first image files 113, to thereby display to a potential buyer 71 an enlarged image of the first item $I_1$, e.g., an image chosen from set 113. The second set of scaled first item images 114 can be sized according to a preselected value or sized randomly based on a specified size range. Regardless, the second set of scaled first item image 114 can generally range between 100 pixels by 100 pixels and 200 pixels by 200 pixels, preferably 100 pixels by 100 pixels and 125 pixels by 125 pixels, still more preferably 110 pixels by 110 pixels. Note, according to the preferred embodiment, the images are not distorted to fit the ranges described above, but rather are scaled so that the widest portion of the image fits within the above described ranges.

The sets of scaled first item image files 113, 114, according to an embodiment of the present invention, can additionally provide other image attribute variations (not shown) of the item image 110 of the first item $I_1$, such as, for example, brightness, contrast, color enhancements, or other picture qualities known to those skilled in the art. These images, also can have categorical size variations, are also selectable by the selling user S to thereby allow the selling user S to select overtly or by default an image or images having enhanced visual attributes, e.g., image files 115a, 115b, that best represent the first item $I_1$.

After image selection by the selling user S of preferably one large image, e.g., 115a, and one small image, e.g., 115b, from the respective first and second sets of first item images 113, 114, a reference to the large and small selected images 115a, 115b, or the images themselves, can be incorporated in the item-creation form 91. The images not selected can be discarded to minimize storage requirements. Additionally, if desired, the selling user S can select or otherwise upload another item image file 110 displaying another view of the first item $I_1$ or, if the first item $I_1$ includes multiple sub-items, the selling user S can select or otherwise upload an image file 110 for each of the sub-items of the first item $I_1$, as described previously.

Regardless of the number of item image files 110 selected or otherwise uploaded by the selling user S, as with selecting or otherwise uploading the item image file 110, described above, once each additional item image file 110 is provided to or accessed by the remote marketplace administrator server 35, one or more but preferably at least two sets of scaled first item image files 113, 114, can be generated and displayed for each additional item image file 110. Further, either before, after, or partially before and after the selling user S selects or otherwise uploads the one or more item image files 110 and selects an appropriate image provided therefrom, the selling user S enters data for other fields utilized to describe the various attributes of the first item $I_1$. For example, the item-creation form 91 can include fields such as: a main category and/or subcategories of the item; a title and/or subtitle of the item; a physical location of the item, if applicable; pricing information; the item description; user selectable visual enhancements, i.e., highlighting; payment requirements; and shipping requirements and limitations.

Upon submitting the completed item-creation form 91, associated data entered in the form is then sent over the communication network 33 from the selling user computer 61 to be received by the marketplace administrator server 35 (block 149) for associating with the online marketplace web site (see FIG. 8). The chosen large and small images, e.g., 115a, 115b (see FIG. 16), can be somewhat more permanently stored in or otherwise associated with an image file server 51 or other associated remote server (block 151). A selling marketplace item web page, e.g. web page 133 (FIG. 17), can then be created that includes added therein a location and/or instructions to access and display the chosen large and small images each in at least one location within the web page 133 (block 153). If multiple original images 110 were uploaded to provide multiple views of the marketplace item, according to an embodiment of the method, each chosen small image and a default one of the chosen large images can be associated with web page 133. The web page 133 can then be presented to or otherwise made available on the online marketplace website to be presented to the potential buyer B (block 155).

According to an embodiment of the present invention, and as perhaps best shown in FIG. 17, the method also includes providing item information such as, for example, an item identification number, title, subtitle, starting price, time remaining until expiration, start time, history, item location, shipping restrictions, and sales tax requirements. The method can also include providing within the item web page 133 a functional link to allow the item, e.g., item $I_1$, to be added to a potential buyer watch list so that the potential buyer B can monitor the status of the item $I_1$, and a functional link to allow the item $I_1$ to be placed on a potential buyer calendar so that the potential buyer B can better visualize auction or sale item listing expiration dates for various items of interest to the potential buyer B.

The method can also include providing a seller marketplace item web page 133 having selling user information including, for example, a personal rating, business rating, percent of positive ratings, repeat rating, membership status, ratings and comments about the selling user S, and other information known to those skilled in the art. The method can further include providing a link to the selling user S within the seller item web page 133 to advantageously provide the potential buyer B an ability to request additional information about the item $I_1$. Advantageously, as described previously, this functionality can provide a pre-formatted automated e-mail to the selling user S whereby the subject, greeting, and/or closing are already provided and the potential buyer B need only enter a question in a provided text entry field (not shown) in order to provide such question to the selling user S.

According to an embodiment of the present invention, similarly, a second selling user S' (see FIG. 6) can upload an original item image file 120 displaying an item image of a second item $I_2$, to be received by the marketplace administrator server 35. One or more but preferably at least two or more sets of scaled second item images or image files, e.g., sets 123, 124, are generated, temporarily stored in, e.g., the image file server 51, and presented or otherwise provided to the selling user web browser, with the original item image file 120 being discarded to conserve memory and reduce storage requirements. The selling user S' can choose (select) a chosen item image 125a-127a, 125b-127b, preferably from each set 123, 124, best representing the second item $I_2$, or be provided such image by default. That is, one image in each set 123, 124, can have an input field, such as a checkbox, preselected to identify a default image which can be deselected by the selling user in response to an alternate selection. The second seller user S' can complete the item-creation form 91, and the system 30 can make the chosen images available for creating and presented a seller item web page 133 for the second item $I_2$, as described with respect to the first selling user S.

As shown in FIGS. 9-14, according to an embodiment of the present invention, provided is a method for facilitating e-commerce between a plurality of selling users and a plurality of potential buyers over a computer network which includes the step of providing a potential buyer B a keyword or item number search function whereby the potential buyer B may either enter key words matching those in, for example, an item's title, subtitle, or description; or the item number of the item assigned to the respective item by the system 30, or other relational attributes such as, for example, minimum price, maximum price, item category, and/or selling user identification.

In response to receiving the search criteria presented by a potential buyer web browser (see FIG. 9), the system 30 can provide a search results web page 131 including a list of items satisfying the search results criteria including various attributes, such as an associated item title, for each of the item satisfying the search results criteria, and can include an item image file name or location of a chosen item image file, e.g., image file 115a or 115b, for each of the items satisfying the search results criteria, if provided by the respective selling user when completing the item-creation form 91, described above, along with display instructions (see FIG. 10). The potential buyer web browser can then request and be provided each of the chosen item images for each item image satisfying the search criteria according to the provided instructions (see FIGS. 11-12). According to the provided instructions, the potential buyer web browser can then resize the provided chosen item images (see FIG. 13) to be displayed in a table of items satisfying the search results criteria (see FIG. 14).

The method can also include providing the search results web page 131 such that it includes a standardized layout of the different items provided by different selling users S in accordance with the search criteria. This search results web page 131 can be developed to include hyperlinks to each of the various seller item web pages 133 satisfying the search criteria associated with the respective titles of the items, and/or icons 132 each providing a hyperlink to each respective seller item web page 133 associated with an item satisfying such search criteria. Each icon can be displayed in the form of one of the chosen item image, e.g., image file 115a or 115b adjusted to a standard size. As shown in FIGS. 15-17, upon access of either hyperlink by the potential buyer B, a seller item web page 133 associated with the selected image can be presented, the respective item data can be received, and the respective chosen item images 115a, 115b, for example, can be retrieved and displayed.

Figure 20:
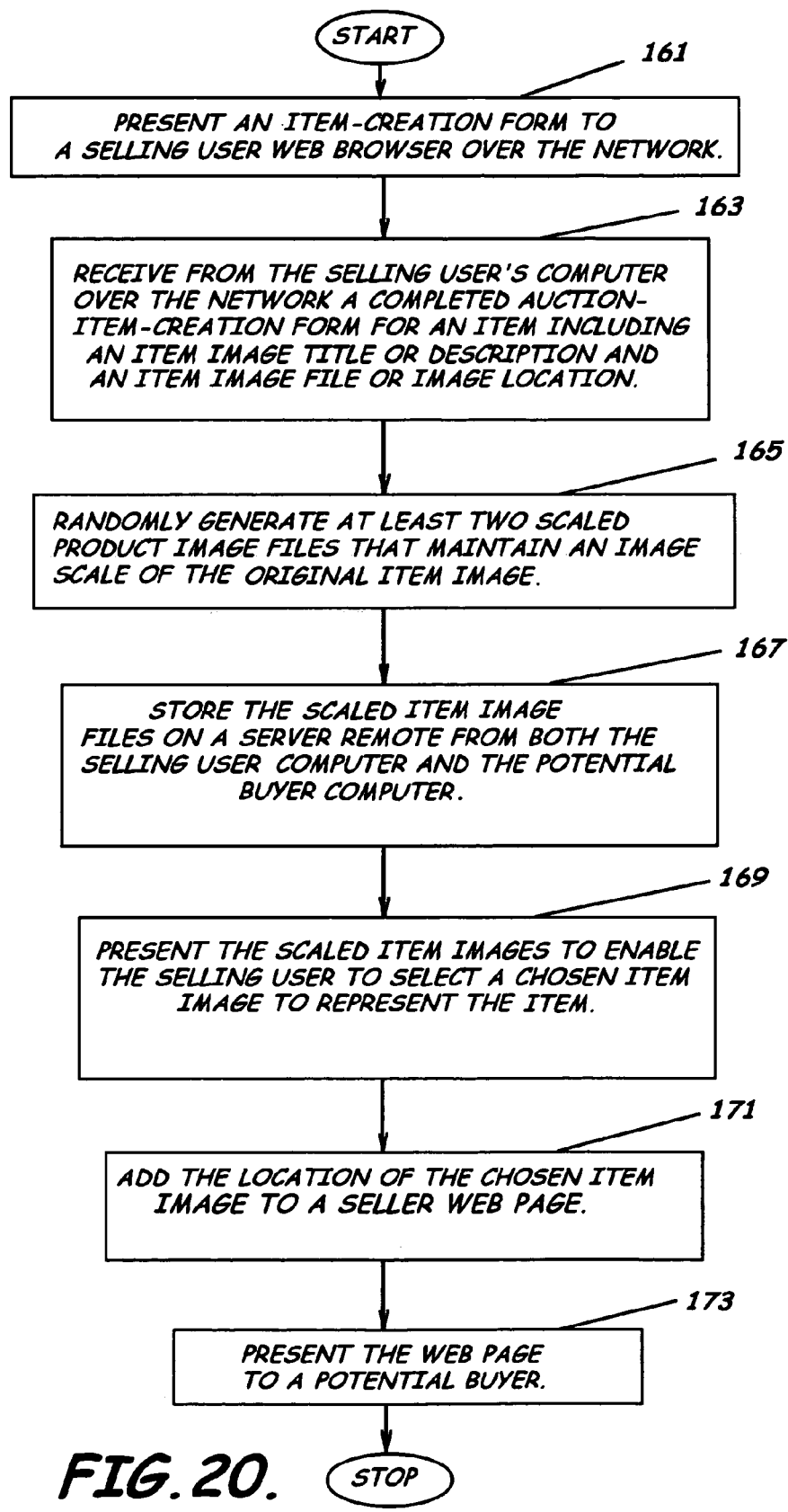
FIG. 20 is a block flow diagram illustrating a method of facilitating electronic commerce at an online marketplace between a selling user computer and a potential buyer computer over a computer network according to an embodiment of the present invention.

According to an alternative embodiment of the present invention, advantageously provided is a method of facilitating electronic commerce between a selling user computer 61 and a potential buyer computer 71 over a network 33. As shown in FIG. 20, in this embodiment an item-creation or item registration form 91 (see FIG. 3) is presented to a selling user web browser over the network 33 (block 161). Once the selling user S completes the form, a completed item-creation form 91 for a first item $I_1$ to be sold (block 163) is then sent and received from the selling user computer 61 over the network 33. The completed item-creation form 91 preferably includes a first item title, description, and a first item image file 110. Once the first item image 110 is received by an online marketplace website's remote marketplace administrator server 35, at least two scaled first item image files, but preferably three or more first item image files 115, 116, 117 (see FIG. 7), having different sizes, e.g., 100 pixels by 150 pixels, 200 pixels by 250 pixels, 300 pixels by 350 pixels, are randomly generated (block 165) that can maintain an image scale of the first item image file 110. Also generated can be multiple variations, e.g. preferably three, of the digital image for each of the first item image files 115, 116, 117. The scaled first item image files 115, 116, 117, can utilize a randomly determined scaling factor and randomly create a separate image file for each of the scaled first item image files 115, 116, 117. The scaled first item image files 115, 116, 117, are stored at least temporarily on the remote administrator server 35 or a remote server associated therewith (block 167). Note, although other sizing schemes are possible, the smallest scaled version preferably is approximately 100 pixels by 100 pixels to ensure that enough details can be seen by a potential buyer.

To enable the selling user S to determine the image that best represents the first item $I_1$, the scaled first item image files 115, 116, 117, can be presented to the selling user S to enable the selling user S to select a chosen first item image, e.g., image file 115, to represent the first item $I_1$ (block 169). A seller web page, e.g., seller item web page 133, as shown, for example, in FIG. 15 and 18, is then created to include the chosen first item image 115 or the location of the chosen first item image 115 (block 171). To save storage space on the remote server, only the chosen first item image, e.g. image 115 is stored on the administrator server 35, database server 43 or image file server 51.

When the selling user S submits the form 91, the selling user web browser can transmit the information provided by the selling user S, along with the first item image file 110, or indicia thereof, to the administrator server 35, in real-time, to reduce any lag time before the selling user S information about the item "goes live" on the online marketplace website. As shown in FIG. 15, once the seller selects the chosen first item image, e.g. image 115, the seller web page 133 can then be immediately available on the online marketplace website to be presented to a potential buyer B (block 173).

As perhaps best shown in FIG. 18, according to embodiments of the present invention, the chosen first item image 115 can be resized for use in different locations on the seller item web page 133. For example, the seller item web page 133 can use the chosen first item image 115 in different sizes and different locations within the web page 133. For example, a smaller version of the chosen first item image 115 can be used within a list of items on the web page 133. A larger image of the chosen first item image 115 can be displayed to show the number of bids on the first item $I_1$ on the web page 133. An even larger image of the chosen first item image 115 can be displayed to provide the potential buyer B with details about the first item $I_1$ on the web page 133. Resizing of the chosen first item image 115 can be performed by use of the potential buyer web browser. Resizing of the chosen first item image 115 is in response to program instructions from the e-commerce program product 81 and image processing and storage program product 83 stored in the memory 37 of the administrator server 35, as shown in, e.g., FIGS. 2 and 6.

As shown in FIG. 6, the methods of facilitating electronic commerce between the selling user computer 61 and the potential buyer computer 71 over a network 33 can include having more than one selling user, e.g., users S, S', that are selling more than one item, e.g., items $I_1, I_2$, as shown in FIG. 6. According to an embodiment utilizing more than one selling user, the method preferably includes presenting an item-creation form 91 (FIG. 3) to a second selling user web browser over the network 33. The second selling user S' accesses through the second selling user computer 61' (FIG. 7), the item-creation form 91 to create another seller item web page 133 to thereby provide information for one or more associated marketplace items. Once the second selling user S' completes the form 91, the form 91 is then sent to the administrator server 35. The administrator server 35 receives a completed item-creation form 91 for a second item 12 to be sold from the second selling user computer 61 over the network 33. During form completion, the selling user S' selects or otherwise uploads an item image file 120 displaying an image of the second item $I_2$. This item image file 120 for the second item $I_2$ can be identified by file location or address within a selling user computer 61' associated storage device or uniform resource locator.

According to an embodiment of the present invention, once the item image file 120 is accessed by or otherwise provided to the remote marketplace administrator server 35, one or more but preferably at least two sets of scaled second item image files 123, 124, are generated and displayed. The sets of scaled second item image files 123, 124, can provide categorical image size variations of the item image 120, selectable by the selling user S', to thereby allow the selling user S' to select an image 125a-127a, 125b-127b, best representing the second item $I_2$ from each set 123, 124.

After image selection by the selling user S' of preferably one large image and one small image 125a, 125b, from the respective first and second sets of second item images 123, 124, a reference to the large and small chosen images 125a, 125b, or the images themselves, are incorporated in the item-creation form 91 along with a title and/or description of the second item $I_2$ provided by the selling user S'. The images not selected can be discarded to minimize storage requirements. Further, if desired, the selling user S' can select or otherwise upload another item image file 120 displaying another view of the second item 12 or, if the second item $I_2$ includes multiple sub-items, the selling user S' can select or otherwise upload an image file 120 for each of the sub-items of the second item $I_2$.

As shown in FIG. 7, according to another embodiment of the present invention, the completed item-creation form 91 instead includes the second item title and/or description and a second item image file 120. In this embodiment, at least two, but preferably three or more scaled second item image files 125, 126, 127, having different sizes that maintain an image scale of the second item image file 120 are then randomly generated and stored in the memory 37 of the administrator server 35 or other memory accessible to the administrator server 35. The scaled second item image files 125, 126, 127, are then presented to enable the second selling user S' to select a chosen second item image to represent the second item $I_2$. A second seller item web page 133 including the chosen second item image or more generally, a reference thereto, is then created and presented to the potential buyer B.

In addition to having more than one selling user, embodiments of the present invention can include having more than one potential buyer, as understood by those of skill in the art. When the methods and systems of the present invention are used in an auction marketplace setting, having more than one potential buyer B is often advantageous for the selling user S. When there is more than one potential buyer B, the final selling price of the item or items $I_1$, $I_2$, is typically much higher than it would have been if there had only been one potential buyer B.

Figure 21:
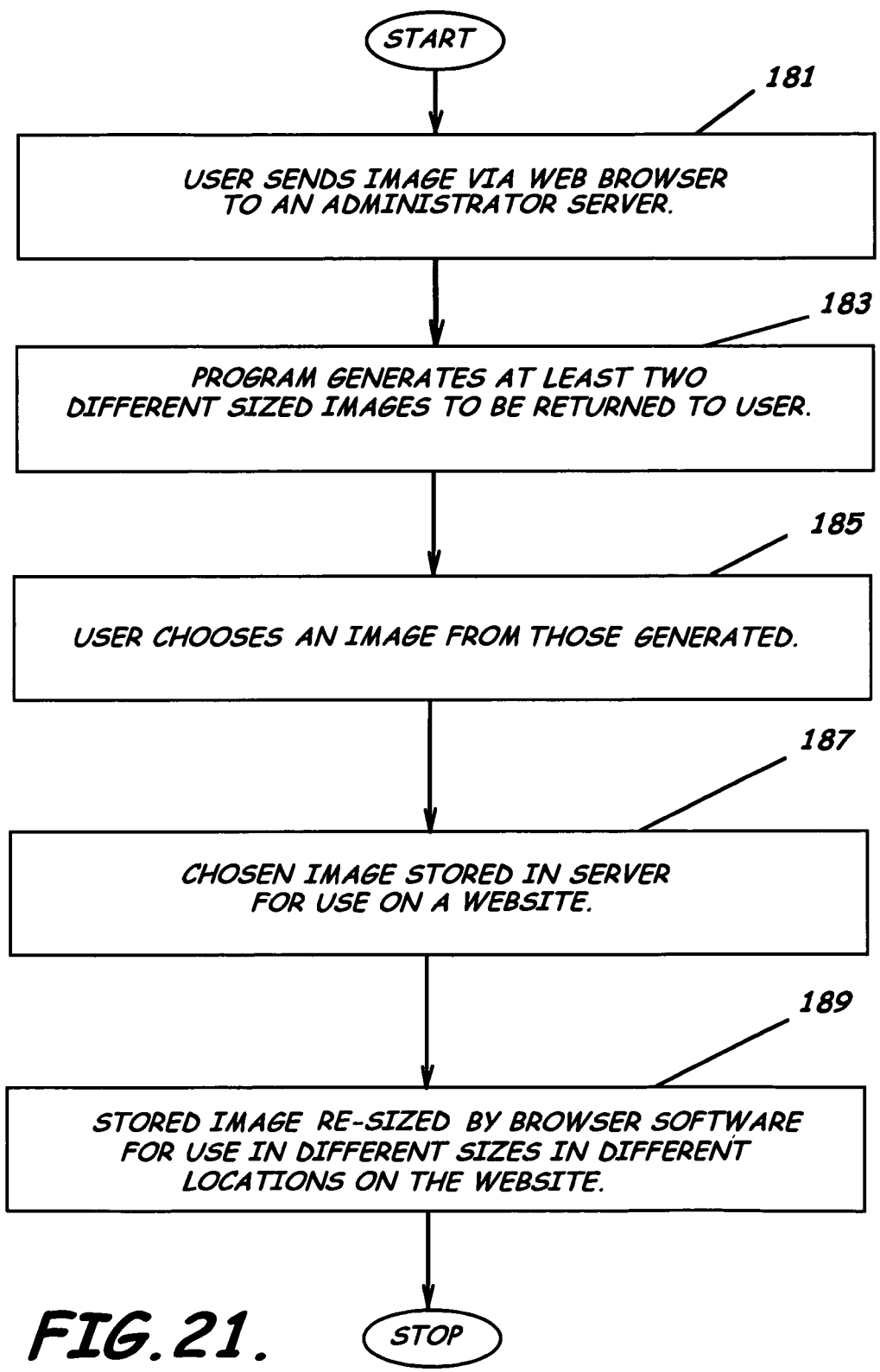
FIG. 21 is a block flow diagram illustrating another method of facilitating electronic commerce at an online marketplace between a selling user computer and a potential buyer computer over a computer network according to an embodiment of the present invention.

As shown in FIG. 21, another embodiment of the present invention advantageously provides another method of facilitating electronic commerce on an internet marketplace website between a selling user computer 61 and a potential buyer computer 71 over a computer network 33. In this embodiment, an original image 110 of a first item $I_1$ is sent using a selling user web browser to an internet marketplace administrator server 35 (block 181). Once the original image 110 of the first item $I_1$ is sent to the administrator server 35, at least two but preferably three or more different size images 115, 116, 117, are generated (block 183) and returned to the selling user S for selection by the selling user S. These images 115, 116, 117, can be randomly generated to represent the first item $I_1$. The selling user S chooses (selects) a first chosen item image, e.g., image file 115, that is selected from the different size images 115, 116, 117 (block 185). As also shown in FIG. 7, the first chosen item image, e.g., image file 115, can be stored in a server database 41 or on an image file server 51 for use on the internet marketplace website (block 187). The stored first chosen item image 115 is resized (block 189), for use in different sizes in different locations on the internet marketplace website.

In addition to using the methods and systems described herein for use with online auction websites, the methods and systems of the present invention can advantageously be used in retail, catalogs, or direct sales websites, as well. As another embodiment of the present invention that can be used on other sales websites, the present invention advantageously provides a method of facilitating electronic commerce over a computer network 33. In this embodiment, an original image 110 of a first item $I_1$ can be transmitted using a selling user web browser of a selling user computer 61 to a website administrator server 35 positioned remote from the selling user web browser. At least two but preferably three or more different size images 115, 116, 117, are randomly generated to be returned to the selling user S for selection by the selling user S to represent the first item $I_1$. The selling user S then selects a first chosen item image, e.g., image 115. The first chosen item image 115 is preferably selected from the different sized images 115, 116, 117. The first chosen item image 115 is then stored in a server database 41 or on an image server 51 for use on a website hosted by the website server 35 to be accessed by potential buyers B. The stored first chosen item image 115 is then resized for use in different sizes in different locations on the website hosted by the website server 35, as shown in, e.g., FIG. 18.

It is important to note that while embodiments of the present invention have been described in the context of a fully functional system, those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD–R/RWs, DVD+R/RWs, flash drives, and other newer types of memories, and transmission type media such as digital and analog communication links.

As shown in FIGS. 1-22, embodiments of the present invention include a computer readable medium that is readable by a computer to facilitate e-commerce between a plurality of selling user's (selling user computers) and a plurality of potential buyers (potential buyer computers) over a computer network as described above, particularly with respect to the program product and the computer executable method steps, described above. For example, according to an embodiment of the present invention, a computer readable medium that is readable by a computer facilitating electronic commerce between a selling user computer and a potential buyer computer in a computer network is provided. The computer readable medium can include a set of instructions that, when executed by the computer, cause the computer to perform the operations of presenting an item-creation form 91 to a selling user web browser over the computer network 33, and receiving from the selling user computer 61 over the network 33 an original item image file 110 displaying an item image of the marketplace or auction item $I_1$ or other type of item for sale. The operations can also include generating or forming from the original item image file 110 one or more, but preferably at least two sets of scaled first item image files 113, 114, to provide image size variations of the item image. These sets of scaled image files 113, 114, as described previously, can be randomly sized within predetermined size ranges or sized according to preselected values.

The operations can also include presenting to the selling user web browser the set or sets of scaled item image files 113, 114, to enable the selling user to select a chosen item image files 115a-117a, 115b-117b, from each set of scaled item image files 113, 114. In preferred embodiments of the present invention where two sets of scaled item image files 113, 114 are provided, the sets of scaled item image files 113, 114, represent a relatively large and relatively small versions, respectively, of the item image of the item $I_1$, with the first set of scaled item image files 113 substantially larger than the second set of scaled item image files 114. The operations also include receiving from the selling user computer 61 over the network 33 a completed item-creation form 91 for the item $I_1$, with the completed item-creation form 91 including, for example, an item title, description, for the marketplace or auction item or other item for sale, and either a reference location for the chosen item image or images, e.g., image files 115a, 115b, or the images themselves. The operations also include those for storing the chosen item image or images, e.g., images files 115a, 115b, on a server remote from both the selling user computer 61 and the potential buyer computer 71 such as, for example, image file server 51, and discarding the original image file 110 to reduce storage requirements for the remote server. The operations can also include adding to, incorporating in, or creating in a seller item web page 133 the chosen item image or images, e.g., images files 115a, 115b, and presenting the seller item web page 133 to a potential buyer B.

According to an embodiment of the present invention, a computer readable medium includes a set of instructions that, when executed by the computer, cause the computer to perform the operations of: presenting an item-creation form such as, for example, the item-creation form 91, to a selling user web browser over the computer network 33, and receiving from the selling user computer 61 over the network 33 an original item image file 110 displaying an item image of an item for sale $I_1$. The operations can also include forming from the original item image file 110 at least two but preferably three or more scaled first item image files 115, 116, 117, to provide image size variations of the item image. These sets of scaled image files 115, 116, 117, can be randomly sized within predetermined size ranges or sized according to preselected values.

The operations can also include presenting to the selling user web browser the scaled item image files 115, 116, 117, to enable the selling user to select a chosen item image, e.g., image file 115, from the scaled item image files 115, 116, 117. In preferred embodiments of the present invention where two scaled item image files, image files 115 and 116 are chosen, one of the image files can represent a relatively large and the other a relatively small version, respectively, of the item image of the item $I_1$. The operations also include receiving from the selling user computer 61 over the network 33 the completed item-creation form 91 for the item $I_1$ with the completed item-creation form 91 including an item title, description, and either a reference location for the chosen item image or images, e.g., image files 115, 116, or the images themselves. The operations also include those for storing the chosen item image or images, e.g., image files 115, 116, on a server remote from both the selling user computer 61 and the potential buyer computer 71 such as, for example, image file server 51, and discarding the original image file 110 to reduce storage requirements for the remote server. The operations can also include adding to, incorporating in, or creating in a seller web page 133 the chosen item image or images, e.g., image 115, 116, and presenting the seller item web page 133 to a potential buyer B.

According to an embodiment of the present invention, the computer readable medium includes a set of instructions that, when executed by the computer, cause the computer to perform the operations of: presenting an item-creation form 91 to a selling user web browser over the computer network 33, and receiving a completed item-creation form 91 for a first sale item $I_1$ from a selling user computer 61 over the network 33, the completed item-creation form 91 including, for example, a first item title, first item description, and a first item image file 110 or reference thereto. The operations also include randomly generating the at least two scaled first item image files 115, 116, that maintain an image scale of the first item image file 110, storing the at least two scaled first item image files 115, 116, on a remote server 35, presenting the at least two scaled first item image files 115, 116 to the selling user web browser over the network 33 to enable a selling user to select a chosen first item image 115 to represent the first item $I_1$, and discarding the first image file 110, responsive to generating the at least two scaled first item image files 115, 116, to reduce memory requirements. The operations also include creating and/or incorporating in a seller web page 133 the chosen first item image 115, e.g., via image location, and presenting the seller web page 133 to a potential buyer B.

According to an embodiment of the present invention, provided is a computer readable medium including instructions to provide a plurality of potential buyers B (potential buyer computers 71) a keyword or item number search function whereby the potential buyer B may either enter key words matching those in, for example, an item's title, subtitle, or description, or the item number of the item assigned to the respective item by the system 30, or other relational attributes such as, for example, minimum price, maximum price, item category, and/or selling user identification. The computer readable medium can include a set of instructions that, when executed by the computer, cause the computer to perform the operations of receiving search criteria presented by a potential buyer web browser (see FIG. 9), and providing a search results web page, such as web page 131, including a list of items satisfying the search results criteria.

Figure 10:
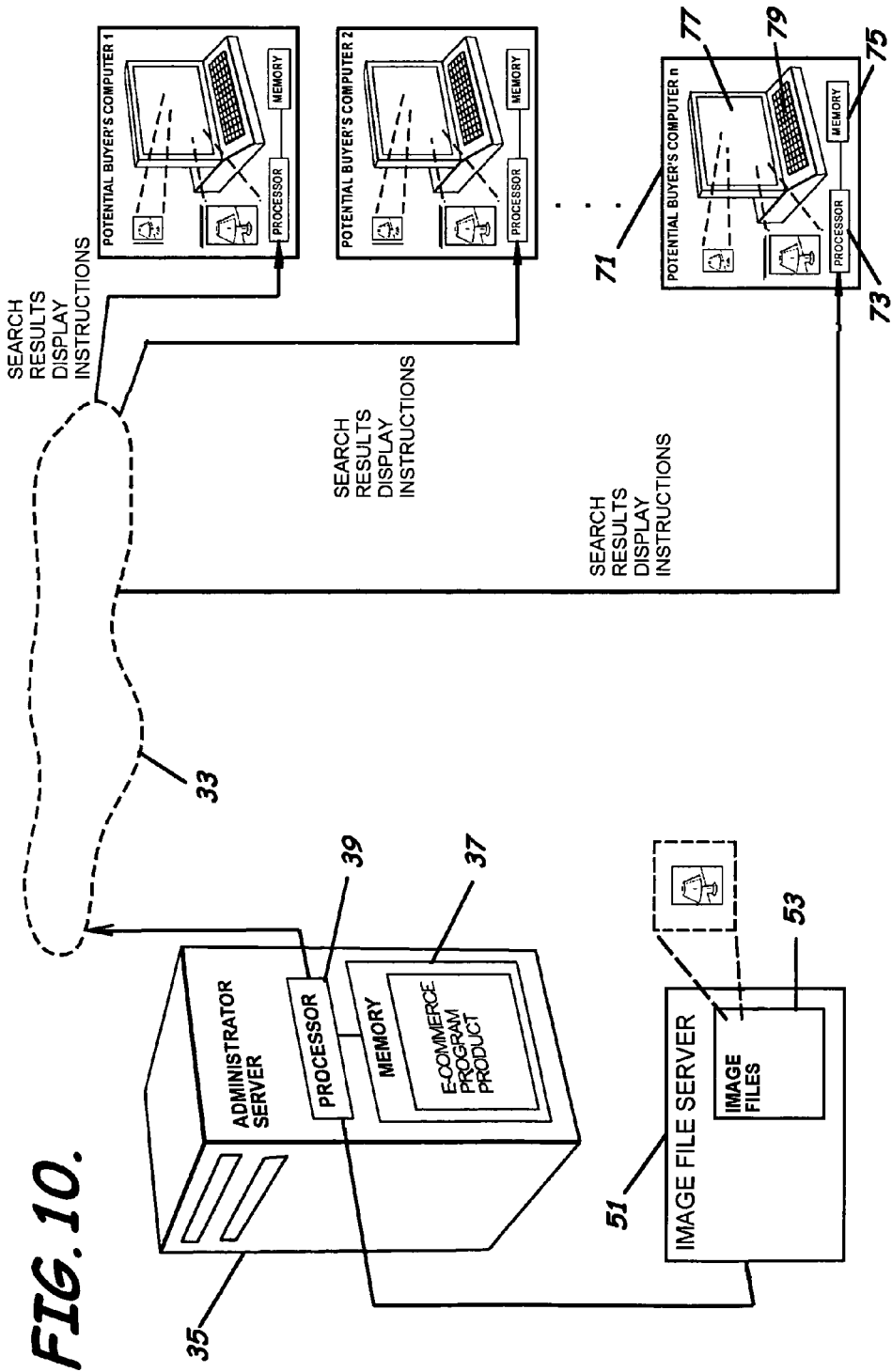
FIG. 10 is a schematic block diagram of a portion of a system to facilitate electronic commerce illustrating providing search results satisfying search criteria for a plurality of items according to an embodiment of the present invention.
Figure 11:
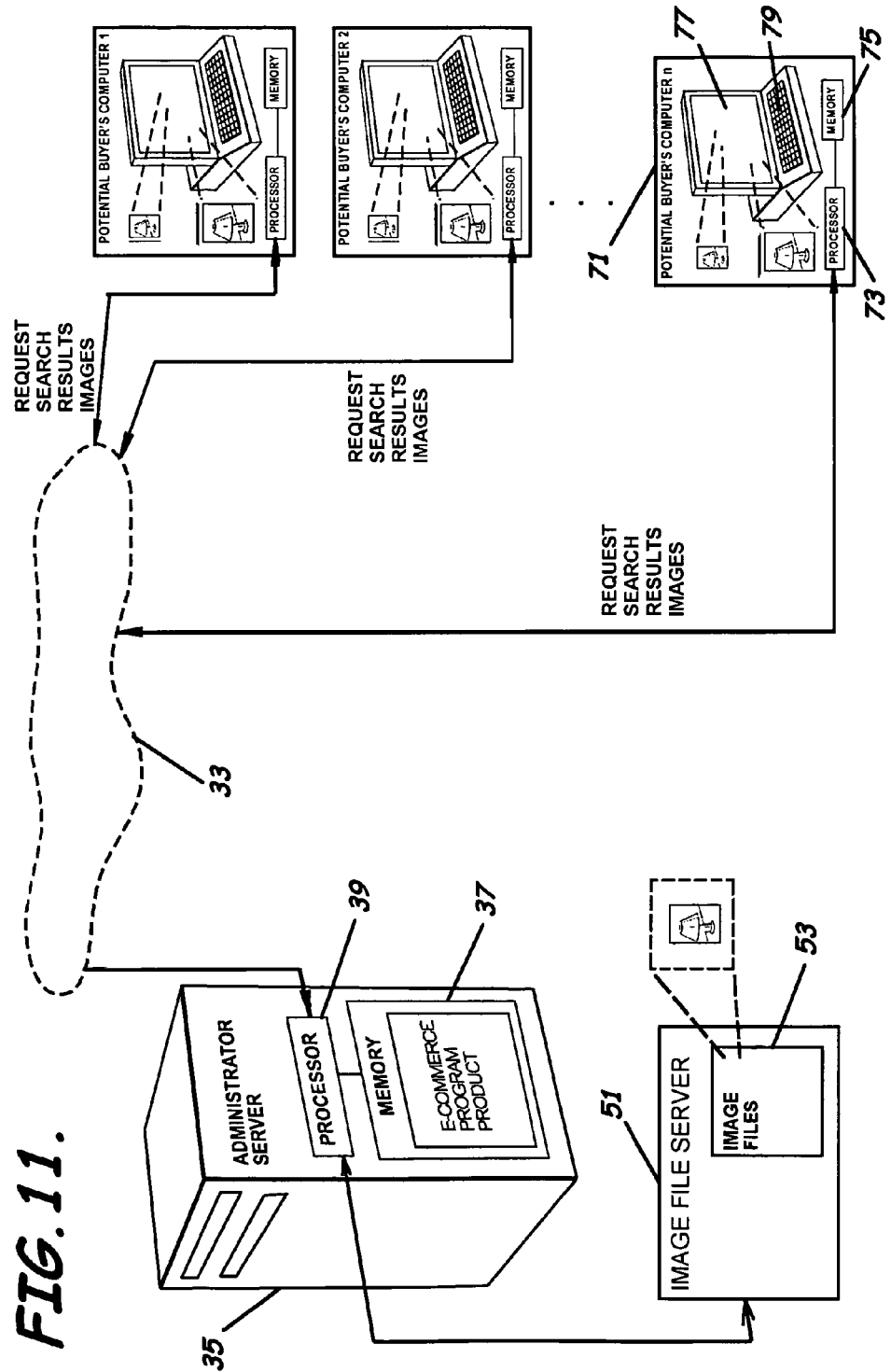
FIG. 11 is a schematic block diagram of a portion of a system to facilitate electronic commerce illustrating requesting images for a plurality of items meeting search criteria according to an embodiment of the present invention.
Figure 12:
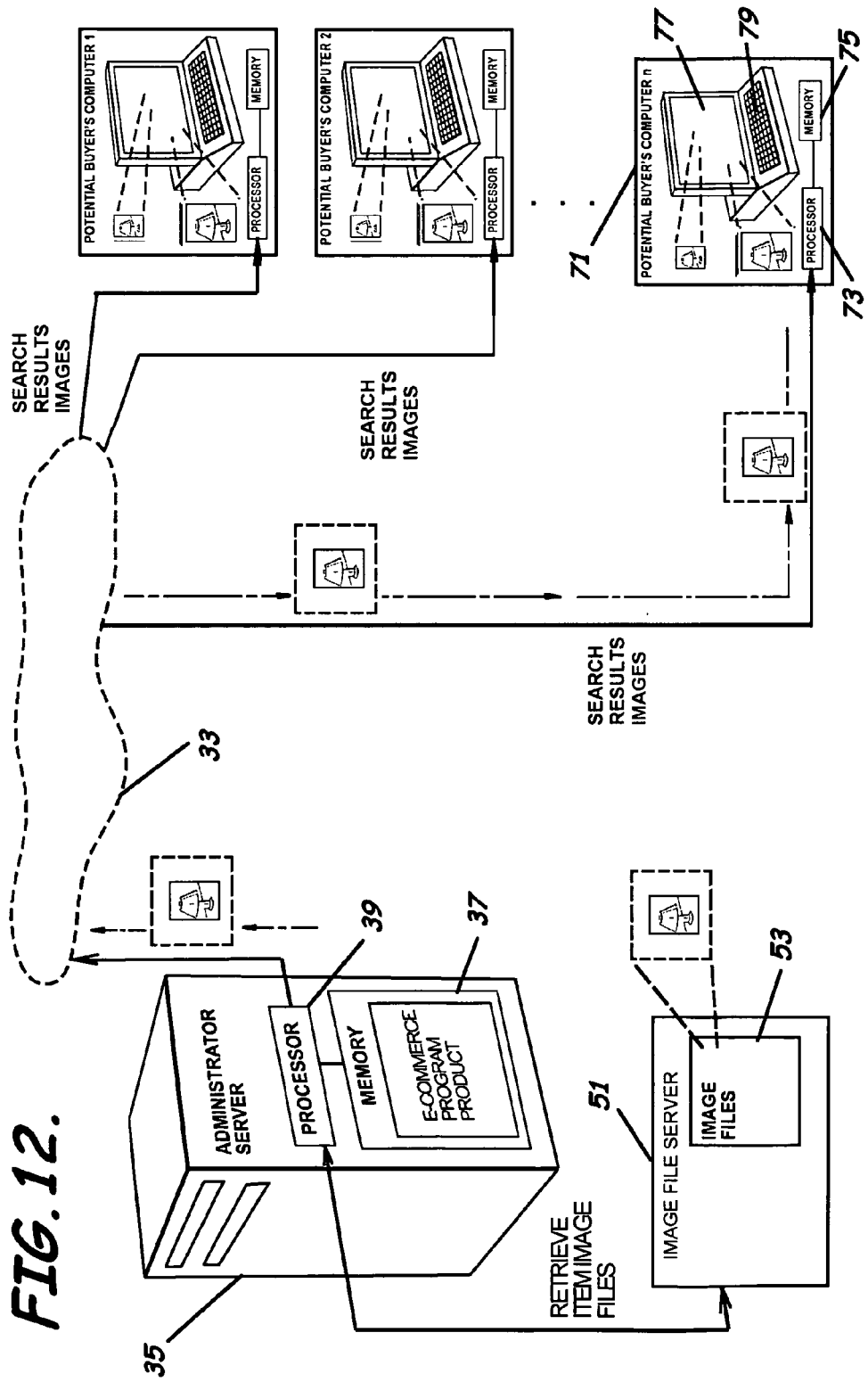
FIG. 12 is a schematic block diagram of a portion of a system to facilitate electronic commerce illustrating providing images for a plurality of items meeting search criteria according to an embodiment of the present invention.
Figure 13:
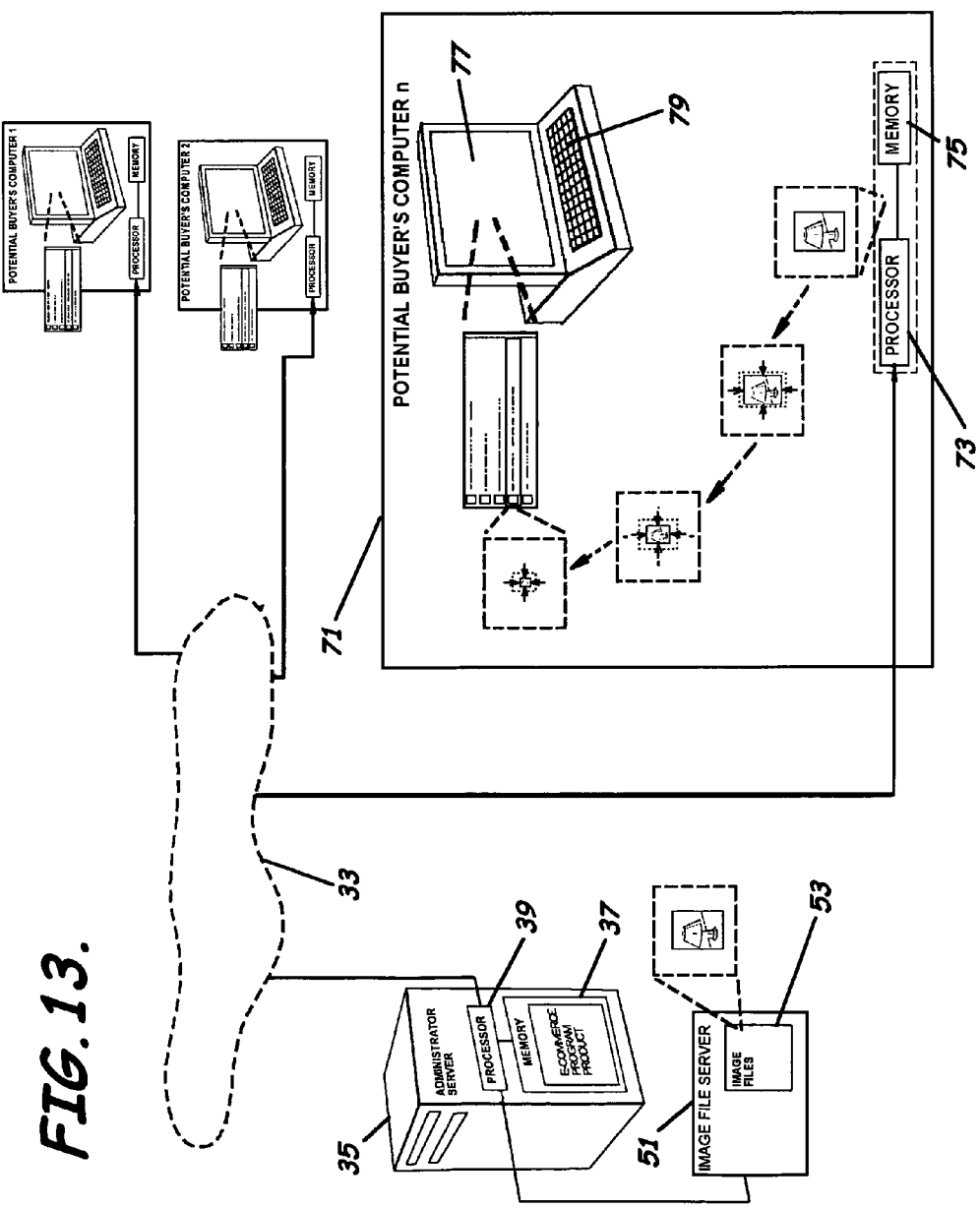
FIG. 13 is a schematic block diagram of a portion of a system to facilitate electronic commerce illustrating a potential buyer computer sizing a requested image according to an embodiment of the present invention.
Figure 14:
FIG. 14 is a schematic block diagram of a search results web page to facilitate electronic commerce according to an embodiment of the present invention.

The search results can include various attributes such as, for example, an associated item title for each of the item satisfying the search results criteria and an item image file name or location of a chosen item image file, e.g., image file 115a or 115b, for each of the items satisfying the search results criteria, along with display instructions (see FIG. 10). The operations can also include providing a chosen item image for each item image satisfying the search criteria, in response to a request for such images (see FIGS. 11-12). Such images can be displayed by the potential buyer web browser along with associated hyperlinks (see FIGS. 13-14) in accordance with provided instructions. The instructions can also include those to perform the operation of providing a respective seller web page such as, for example, seller item web page 133 (FIG. 17), in response to access of either hyperlink by the potential buyer B, as shown, for example, in FIGS. 15-17. Accordingly, the seller item web page 133 data can be displayed in a manner similar to that described with respect to the search results web page 131 according to instructions provided by the computer readable medium.

It is important to note that operating instructions described in the present invention are not inherently related to or required by a particular computer or other server hardware. Many of the operations performed by the various computers can be either consolidated or distributed differently than as described. Various conventional computers or servers can be used according to the present invention. Also, any process may be divided across multiple processors or computers. In addition, the present invention is not described with reference to any particular programming language. It will be understood that a variety of programming languages may be used to implement the system and method of the present invention as described herein.

As an advantage of the present invention, embodiments of the present invention enable the selling user S to obtain a better image of the item $I_1$ than the selling user S originally submitted. For example, in the event that the picture of the first item does not display enough detail about the item, i.e., if the image is not close enough, the random image generator 87 of the present invention can randomly generate at least two other images with varying zoom or other properties to enable the selling user S to select and use an image with, for example, a closer view or a view with a different angle or perspective. This feature is particularly advantageous because it enable the selling user S to submit one digital image 110, as opposed to having to obtain, load, and transmit multiple images in order to obtain an image that shows sufficient detail about the item $I_1$ when displayed by a Web browser. The randomly generated images enable the selling user S to have a better selection of images with different closeness to select from to represent the item $I_1$. The methods and systems of the present invention allow the selling user S to determine the quality of the chosen first item image that is shown or posted on the item webpage 133. As another advantage of the present invention, although primarily illustrated by way of example with respect to auctions, the systems and methods described herein can be used in both auction settings and direct selling settings, alone or in combination. Many merchants sell their items in both formats: auctions and direct sales. Utilizing the same methods and systems in both formats makes use of the e-commerce methods and systems seamless to users of the system.

In the drawings and specification, there have been disclosed a typical preferred embodiment of the invention, and although specific terms are employed, the terms are used in a descriptive sense only and not for purposes of limitation, the scope of the invention being set forth in the following claims. The invention has been described in considerable detail with specific reference to these illustrated embodiments. It will be apparent, however, that various modifications and changes can be made within the spirit and scope of the invention as described in the foregoing specification.

What is claimed is:

1. A system to facilitate electronic commerce associated with an online marketplace between a plurality of selling users and a plurality of potential buyers over a computer network, the system comprising:

a host computer accessible to the computer network to host the online marketplace to thereby define a marketplace administrator server, the marketplace administrator server having memory coupled to a processor to store operating instructions therein;

a marketplace administrator server database accessible to the processor of the marketplace administrator server and having database records related to a plurality of items to be sold by the plurality of selling users;

a marketplace administrator image file server accessible to the processor of the marketplace administrator server and having image files related to the plurality of items to be sold by the plurality of selling users;

a plurality of selling user computers each positioned at one or more selling user sites remote from the marketplace administrator server, accessible to the computer network, and having a processor and memory coupled to the processor to store operating instructions therein and to send data related to items for sale to the marketplace administrator server, and a display in communication with the processor to display items to be sold using an associated selling user web browser stored in the memory;

a plurality of potential buyer computers each positioned at a separate potential buyer user site remote from the marketplace administrator server, accessible to the computer network, and having a processor and memory coupled to the processor to store operating instructions therein and to receive data related to items for sale, and a display in communication with the processor to display seller item web pages accessed through the computer network using an associated potential buyer web browser stored in the memory; and online e-commerce program product stored in the memory of the marketplace administrator server and including instructions that, when executed by the marketplace administrator server, cause the marketplace administrator server to selectively perform the operations of:

presenting an item-creation form to a selling user web browser over the computer network, receiving an original item image file from the selling user web browser over the network, the original item image file displaying an item image of an item for sale, forming a first and a second set of scaled item image files from the original item image file to provide image size variations of the item image, storing the first and the second sets of scaled item image files on a remote server, providing the first and the second set of scaled item image files to the selling user web browser over the network to enable the respective selling user to select a first chosen item image file having a first chosen item image from the first set of scaled item image files and to select a second chosen item image file having a second chosen item image from the second set of scaled item image files to thereby represent the item for sale, the second chosen item image having a size substantially smaller than the first chosen item image, receiving a completed item-creation form for the item for sale over the network from the selling user computer, the completed item-creation form including an item title, item description, and data identifying the first and the second chosen item images, adding an item image location of each of the first and the second chosen item images to a seller item web page, and presenting the seller web page to the potential buyer computer.

2. A system as defined in claim 1, wherein the online e-commerce program product includes a random image size generator positioned to randomly size the original item image file uploaded by the selling user to form the first and the second set of scaled item image files; and wherein the selling user computer includes a user interface coupled to the processor of the selling user computer so that the seller user can select from the first set of scaled item image files a first randomly sized image file generated by the random image size generator defining the first chosen item image and so that the seller user can select from the second set of scaled item image files a second randomly sized image file generated by the random image size generator defining the second chosen item image.

3. A system as defined in claim 1, wherein the item for sale is a marketplace item;

wherein each item image file in the first set of scaled item image files is randomly sized within a first preselected size range having an upper and a lower limit;

wherein each item image file in the second set of scaled item image files is randomly sized within a second preselected size range having an upper and a lower limit; and wherein the lower limit of the first preselected size range is substantially larger than the upper limit of the second preselected size range.

4. A system to facilitate electronic commerce associated with an online marketplace between a plurality of selling users and a plurality of potential buyers over a computer network, the system comprising:

a host computer accessible to the computer network to host a selected marketplace website to thereby define a marketplace administrator server, the marketplace administrator server having memory coupled to a processor to store operating instructions therein;

a plurality of selling user computers each positioned at one or more selling user sites remote from the marketplace administrator server, accessible to the computer network, and having a processor and memory coupled to the processor to store operating instructions therein and to send data related to an item for sale to the marketplace administrator server, and a display in communication with the processor to display items for sale using an associated selling user web browser stored in the memory;

a plurality of potential buyer computers each positioned at a separate potential buyer user site remote from the marketplace administrator server, accessible to the computer network, and having a processor and memory coupled to the processor to store operating instructions therein and to receive database records, and a display in communication with the processor to display seller web pages accessed through the computer network using an associated potential buyer web browser stored in the memory; and online e-commerce program product stored in the memory of the marketplace administrator server and including instructions that, when executed by the marketplace administrator server, cause the marketplace administrator server to selectively perform the operations of:
receiving an original item image file from a selling user web browser over the network, the original item image file displaying an item image of an item for sale, and
forming at least one set of at least two seller user selectable scaled item image files from the original item image file to provide image size variations of the item image.

5. A system as defined in claim 4, wherein the online e-commerce program product further includes instructions that, when executed by the marketplace administrator server, cause the marketplace administrator server to selectively perform the operation of:
providing the at least one set of scaled item image files to the selling user web browser over the network to enable the respective selling user to select a chosen item image file having a chosen item image from the at least one set of scaled item image files to thereby represent the item.

6. A system as defined in claim 5, wherein the item for sale is an auction item, and wherein the online e-commerce program product further includes instructions that, when executed by the marketplace administrator server, cause the marketplace administrator server to selectively perform the operations of:
presenting an auction-item-creation form to the selling user web browser over the computer network; and
receiving a completed auction-item-creation form for the auction item over the network from the selling user computer, the completed auction-item-creation form including an auction item title, auction item description, and data identifying the chosen auction item image.

7. A system as defined in claim 5, wherein the item for sale is a marketplace item, and wherein the online e-commerce program product further includes instructions that, when executed by the marketplace administrator server, cause the marketplace administrator server to selectively perform the operations of:

presenting an item-creation form to the selling user web browser over the computer network; and
receiving a completed item-creation form for the marketplace item over the network from the selling user computer, the completed item-creation form including an item title, item description, and data identifying the chosen item image.

8. A system as defined in claim 5,
wherein the online e-commerce program product includes a random image size generator positioned to randomly size the original item image file uploaded by the selling user to form the at least one set of scaled item image files; and
wherein the selling user computer includes a user interface coupled to the processor of the selling user computer so that the seller user can select from the at least one set of scaled item image files a randomly sized image file generated by the random image size generator to represent the item defining the chosen item image.

9. A system as defined in claim 4,
wherein each item image file in the at least one set of scaled item image files is randomly sized within a preselected size range having an upper and a lower limit.

10. Previously presented) A system as defined in claim 4,
wherein the at least one set of scaled item image files is a first and a second set of scaled item image files;
wherein each item image file in the first set of scaled item image files is randomly sized within a first preselected size range having an upper and a lower limit;
wherein each item image file in the second set of scaled item image files is randomly sized within a second preselected size range having an upper and a lower limit; and
wherein the lower limit of the first preselected size range is substantially larger than the upper limit of the second preselected size range.

11. A method of facilitating electronic commerce between a selling user computer and a potential buyer computer over a network, the method comprising the steps of:
presenting an item-creation form to a selling user web browser over the computer network;
receiving an original item image file from the selling user web browser over the network, the original item image file displaying an item image of an item;
randomly generating a first and a second set of scaled item image files from the original item image file to provide image size variations of the item image;
storing the first and the second sets of scaled item image files on a remote server;
presenting the first and the second set of scaled item image files to the selling user web browser over the network to enable the respective selling user to select a first chosen item image file having a first chosen item image from the first set of scaled item image files and to select a second chosen item image file having a second chosen item image from the second set of scaled item image files to thereby represent the item, the second chosen item image having a size substantially smaller than the first chosen item image;
receiving a completed item-creation form for the item over the network from the selling user computer, the completed item-creation form including an item title, item description, and data identifying the first and the second chosen item image;
adding an item image location of each of the first and the second chosen item images to a seller item web page; and presenting the seller item web page to the potential buyer computer.

12. A method as defined in claim 11, the method further including the step of:
resizing the first chosen item image for use in different sizes in different locations on the seller item web page.

13. A method as defined in claim 12, wherein the step of resizing is performed by use of a potential buyer web browser.

14. A method of facilitating electronic commerce between a selling user computer and a potential buyer computer over a computer network, the method comprising the steps of:
receiving an original item image file over the network from the selling user computer, the original item image file displaying an item image of an item for sale; and
forming at least one set of at least two scaled seller user selectable item image files from the original item image file to provide the seller user a choice of selectable image size variations of the item image.

15. A method of claim 14, the method further comprising the step of:
presenting the at least one set of scaled item image files to the selling user computer so that the selling user can select a chosen item image to represent the item for sale.

16. A method of claim 15, wherein the item for sale is an auction item, and wherein the method further comprises the steps of:
presenting an auction-item-creation form over the network to the selling user computer through the selling user web browser; and
receiving a completed auction-item-creation form for the auction item from the selling user computer over the network, the completed auction-item-creation form including an item description and data identifying the chosen auction item image.

17. A method of claim 15, wherein the item for sale is a marketplace item, and wherein the method further comprises the steps of
presenting an item-creation form over the computer network to the selling user web browser; and
receiving a completed item-creation form for the marketplace item over the network from the selling user computer, the completed item-creation form including an item title, item description, and data identifying the chosen item image.

18. A method of claim 14,
wherein the at least one set of scaled item image files is a first set and a second set of scaled item image files presented to provide categorical image size variations of the item image;
wherein the first set of scaled item image files provides a selection of relatively large item images to thereby provide selling user selection of a selling user determined best representation of the item for sale defining a first chosen item image; and
wherein the second set of scaled item image files provides a selection of relatively small item images to thereby provide selling user selection of an item image to define a second chosen item image having a size substantially smaller than the first chosen item image to be used as an icon selectable by a potential buyer viewing a selling user web page to command display of the first chosen item image.

19. A method of facilitating electronic commerce between a selling user computer and a potential buyer computer over a computer network, the method comprising the steps of:
receiving a first original item image file over the network from the selling user computer, the first original item image file displaying a first item image of a first item for sale;
forming a first and a second scaled item image file from the first original item image file, the first scaled item image file providing a relatively large item image of a first item for sale defining a first chosen item image, the second scaled item image file providing a relatively small item image defining a second chosen item image having a size substantially smaller than the first chosen item image to be used as an icon selectable by a potential buyer viewing a selling user web page to command display of the first chosen item image;
receiving a second original item image file over the network from the selling user computer, the second original item image file displaying a second item image of a second item for sale;
forming a third and a fourth scaled item image file from the second original item image file, the third scaled item image file providing a relatively large item image of a second item for sale defining a third chosen item image, the fourth scaled item image file providing a relatively small item image defining a fourth chosen item image having a size substantially smaller than the fourth chosen item image to be used as an icon selectable by the potential buyer viewing the selling user web page to command display of the third chosen item image;
forming the seller web page to display the first and the third chosen item images, the seller web page including a first display field for alternatively displaying the first and the third chosen item images, a second display field for displaying the second chosen item image, and a third display field for displaying the fourth chosen item image; and
alternatively displaying the first and the third chosen item images in the first display field responsive to user selection of the second and the fourth chosen item image, respectively.

20. A computer readable medium that is readable by a computer to facilitate electronic commerce between a selling user computer and a potential buyer computer over a computer network, the computer readable medium comprising a set of instructions that, when executed by the computer, cause the computer to perform the following operations:
receiving an original item image file from a selling user web browser over the network, the original item image file displaying an item image of an item for sale;
randomly generating a first and a second set of scaled item image files from the original item image file to provide image size variations of the item image;
storing the first and the second sets of scaled item image files on a remote server;
presenting the first and the second set of scaled item image files to the selling user web browser over the network to enable the respective selling user to select a first chosen item image file having a first chosen item image from the first set of scaled item image files and to select a second chosen item image file having a second chosen item image from the second set of scaled item image files to thereby represent the item for sale, the second chosen item image having a size substantially smaller than that of the first chosen item image;
receiving a completed item-creation form for the item for sale over the network from the selling user computer, the completed item-creation form including an item title, item description, and data identifying the first and the second chosen item images;

adding an item image location of each of the first and the second chosen item images to a seller item web page; and presenting the seller item web page to the potential buyer computer.

21. A computer readable medium as defined in claim 20, wherein the computer is a marketplace administrator server, the computer readable medium further comprising a set of instructions that, when executed by the marketplace administrator server, cause the marketplace administrator server to perform the following operation:

discarding the original image file, responsive to forming the respective set of the first and the second sets of scaled item image files, to reduce storage requirements for the remote server.

22. A computer readable medium that is readable by a computer to facilitate electronic commerce between a selling user computer and a potential buyer computer over a computer network, the computer readable medium comprising a set of instructions that, when executed by the computer, cause the computer to perform the following operations:

presenting an item-creation form to a selling user web browser over the computer network;

receiving an original item image file from the selling user computer over the network, the original item image file displaying an item image of an item;

randomly generating within a predetermined size range at least two scaled item image files that maintain an image scale of the original item image file;

storing the at least two scaled item image files on a remote server;

presenting the at least two scaled item image files to the selling user web browser over the network to enable a selling user to select a chosen item image to represent the item;

receiving a completed item-creation form for the item over the network from the selling user computer, the completed item-creation form including an item description and data identifying the chosen item image;

adding an image location of the chosen item image to a seller web page; and presenting the seller web page to the potential buyer computer.

23. A computer readable medium as defined in claim 22, the computer readable medium further comprising a set of instructions that, when executed by the computer, cause the computer to perform the following operation:

discarding the original image file, responsive to generating the at least two scaled item image files, to reduce memory requirements.

24. A computer readable medium that is readable by a computer to facilitate electronic commerce between a selling user computer and a potential buyer computer over a computer network, the computer readable medium comprising a set of instructions that, when executed by the computer, cause the computer to perform the following operations:

receiving an original item image file over the network from a selling user computer, the original item image file displaying an item image of an item for sale; and forming at least one set of at least two scaled item image files from the original item image file to provide image size variations of the item image.

25. A computer readable medium as defined in claim 24, the computer readable medium further comprising a set of instructions that, when executed by the computer, cause the computer to perform the following operation:

presenting the at least one set of scaled item image files to the selling user computer so that the selling user can select a chosen item image to represent the item for sale.

26. A computer readable medium as defined in claim 24, wherein the at least one set of scaled item image files is a first and a second set of scaled item image files, and wherein the computer readable medium further comprises a set of instructions that, when executed by the computer, causes the computer to perform the following operation:

presenting the first and the second set of scaled item image files to the selling user computer over the network to enable the respective selling user to select a first chosen item image file having a first chosen item image from the first set of scaled item image files and to select a second chosen item image file having a second chosen item image from the second set of scaled item image files to thereby represent the item for sale, the second chosen item image having a size substantially larger than the first chosen item image.

27. A computer readable medium as defined in claim 26, wherein the item for sale is an auction item, and wherein the computer readable medium further comprises a set of instructions that, when executed by the computer, cause the computer to perform the following operations:

presenting an auction-item-creation form for the auction item to the selling user computer over the network;

storing the first and the second sets of scaled item image files on a server remote from both the selling user computer and a potential buyer computer; and receiving a completed auction-item-creation form for the auction item over the network from the selling user computer, the completed auction-item-creation form including an item description and data identifying the first and the second chosen item images.

28. A computer readable medium as defined in claim 26, wherein the item for sale is a marketplace item, and wherein the computer readable medium further comprises a set of instructions that, when executed by the computer, cause the computer to perform the following operations:

presenting an item-creation form for the marketplace item to the selling user computer over the network;

storing the first and the second sets of scaled item image files on a server remote from both the selling user computer and a potential buyer computer; and receiving a completed item-creation form for the marketplace item over the network from the selling user computer, the completed item-creation form including an item description and data identifying the first and the second chosen item images.

29. A computer readable medium as defined in claim 24, the computer readable medium further comprising a set of instructions that, when executed by the computer, cause the computer to perform the following operation:

discarding the original image file responsive to forming the at least two sets of scaled item image files to thereby reduce memory requirements.

30. A computer memory element containing, stored in tangible computer readable medium, a database, the database containing the following data in computer readable format:

data indicating a community of electronically interconnected users of a publicly accessible computer network; and data indicating a description of a marketplace item, including a location of at least two scaled images of the item generated from an original graphical image of the item supplied by a selling user stored in the database responsive to a selling user communication processed by a computer program product stored in a tangible computer readable medium and including instructions executed by an associated computer.

31. A computer memory element in accordance with claim 30,
wherein the at least two scaled images generated from the original graphical image of the item are each randomly sized within a respective predetermined size range; and
wherein the at least two scaled images generated from the original graphical image of the item are selling user chosen images selected from a plurality of scaled images generated from the original graphical image of the item to be used on a selling user web page to describe the item.

32. A computer memory element containing, stored in signal bearing media, a database, the database containing the following data in computer readable format:
data indicating a community of electronically interconnected users of a publicly accessible computer network; and
data indicating a description of an item for sale including at least two randomly sized scaled images of the item for sale randomly generated from an original graphical image of the item for sale stored in the database responsive to a selling user communication processed by a computer program product stored in a tangible computer readable medium and including instructions executed by an associated computer.

\* \* \* \* \*